(12) United States Patent
Fujimura

(10) Patent No.: US 11,409,257 B2
(45) Date of Patent: Aug. 9, 2022

(54) SETTING DEVICE THAT SETS A PROGRAMMABLE LOGIC CONTROLLER AND PLC SYSTEM THAT COLLECTS CONTROL DATA AND A DASHBOARD FOR DISPLAYING CONTROL DATA

(71) Applicant: Keyence Corporation, Osaka (JP)

(72) Inventor: Masato Fujimura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 41 days.

(21) Appl. No.: 17/012,104

(22) Filed: Sep. 4, 2020

(65) Prior Publication Data

US 2021/0103265 A1 Apr. 8, 2021

(30) Foreign Application Priority Data

Oct. 3, 2019 (JP) .............................. JP2019-183253
Jun. 29, 2020 (JP) .............................. JP2020-111876

(51) Int. Cl.
*G05B 19/05* (2006.01)
*G06F 3/0482* (2013.01)
(Continued)

(52) U.S. Cl.
CPC .......... *G05B 19/056* (2013.01); *G05B 19/058* (2013.01); *G06F 3/0482* (2013.01);
(Continued)

(58) Field of Classification Search
CPC .......... G06F 9/451; G06F 3/0482; G06F 8/60; G06F 3/0484; G06F 3/04842; G06F 8/34; G06F 8/36; G06F 8/38; G05B 2219/31467; G05B 2219/31472; G05B 19/4063; G05B 19/4155; G05B 2219/23246;
(Continued)

(56) References Cited

U.S. PATENT DOCUMENTS 6,154,684 A * 11/2000 Schwenke ............ G05B 19/056
700/159
9,568,909 B2 * 2/2017 Lawson ............... G06F 16/9535
(Continued)

FOREIGN PATENT DOCUMENTS

JP 5661222 B1 1/2015
JP 201897662 A 6/2018

OTHER PUBLICATIONS

U.S. Appl. No. 17/012,112, filed Sep. 4, 2020 (99 pages).

*Primary Examiner* — Nicholas Ulrich
(74) *Attorney, Agent, or Firm* — Kilyk & Bowersox, P.L.L.C.

(57) ABSTRACT

To facilitate work for creating a data utilization program for collecting control data held by a PLC and a dashboard for displaying the control data. A setting device receives selection of a dashboard, receives designation of collection target data, creates setting data including a set of a template of the dashboard and a template of a data utilization program, and transfers the setting data to a PLC. A second executing section of the PLC executes, based on the setting data, predetermined data processing on the collection target data to generate display target data. The display target data is linked with a graph display component included in the template of the display data of the dashboard.

20 Claims, 24 Drawing Sheets

(51) Int. Cl.
*G06F 8/34* (2018.01)
*G06F 3/0484* (2022.01)

(52) U.S. Cl.
CPC .............. *G06F 3/0484* (2013.01); *G06F 8/34* (2013.01); *G05B 2219/13144* (2013.01)

(58) Field of Classification Search
CPC ........... G05B 2219/25067; G05B 2219/31124; G05B 23/0272; G05B 19/0426; G05B 2219/23258; G05B 2219/32128; G05B 23/0267; G05B 19/056; G05B 2219/36133; G05B 2219/31469; G05B 19/05; G05B 19/052; G05B 19/054; G05B 19/058; G05B 2219/13144
See application file for complete search history.

(56) References Cited

U.S. PATENT DOCUMENTS

| | | | |
|---|---|---|---|
| 10,564,622 B1* | 2/2020 | Dean | G06F 16/9017 |
| 2013/0332472 A1* | 12/2013 | Vogel | G06F 16/248 707/754 |
| 2014/0282227 A1* | 9/2014 | Nixon | G06F 9/44505 715/786 |
| 2017/0140071 A1* | 5/2017 | Coates | G06F 16/9024 |
| 2017/0228447 A1* | 8/2017 | Catania | G06F 16/2379 |
| 2019/0018385 A1 | 1/2019 | Soneda et al. | |
| 2020/0125060 A1 | 4/2020 | Fujimura | |
| 2020/0125061 A1 | 4/2020 | Miyasaka | |
| 2020/0259998 A1 | 8/2020 | Tsujikawa | |
| 2020/0310733 A1 | 10/2020 | Fujimura et al. | |

\* cited by examiner

FIG. 16

CYCLE CHART APPLICATION    SETTING WIZARD    — 161

|  | 162a | 162b | 162c | 162d | ATTENTION VALUE [ms] 162e | | | | WARNING VALUE [ms] 162f | | | |
|---|---|---|---|---|---|---|---|---|---|---|---|---|
| No. | MONITORING | ITEM NAME | START SIGNAL | END SIGNAL | | LOWER LIMIT | | UPPER LIMIT | | LOWER LIMIT | | UPPER LIMIT |
| — | ☑ | OVERALL OPERATION | MR000 ↑▶ | MR010 ↑▶ | ☐ | ☐ | ☐ | ☐ | ☐ | ☑ 15000 | ☑ | 17000 |
| 1 | ☑ | NOZZLE 1 ATTACHMENT POSITION MOVEMENT | MR100 ↑▶ | MR101 ↑▶ | ☐ | ☐ | ☐ | ☐ | ☑ | 500 | ☑ | 1500 |
| 2 | ☑ | NOZZLE 1 FALL | MR110 ↑▶ | MR111 ↑▶ | ☑ | 800 | ☑ | 1200 | ☑ | 500 | ☑ | 1500 |
| 3 | ☑ | NOZZLE 1 SUCTION ON | MR120 ↑▶ | MR121 ↑▶ | ☑ | 800 | ☑ | 1200 | ☑ | 500 | ☑ | 1500 |
| 4 | ☑ | NOZZLE 1 RISE | MR130 ↑▶ | MR131 ↑▶ | ☑ | 800 | ☑ | 1200 | ☑ | 500 | ☑ | 1500 |
| 5 | ☑ | NOZZLE 2 FALL | MR200 ↑▶ | MR201 ↑▶ | ☑ | 800 | ☐ | 1200 | ☐ | 500 | ☐ | 1500 |
| 6 | ☐ |  | ↑▶ | ↑▶ | ☐ | | ☐ | | ☐ | | ☐ | |

{ 163 }

OK — 164
CANCEL — 165

FIG. 18

| No. | MONITORING | ITEM NAME | START SIGNAL | END SIGNAL | ATTENTION VALUE [ms] | | WARNING VALUE [ms] | |
|---|---|---|---|---|---|---|---|---|
| | | | | | LOWER LIMIT | UPPER LIMIT | LOWER LIMIT | UPPER LIMIT |
| – | ☑ | OVERALL OPERATION | | | ☐ | ☐ | ☐ | ☐ 17000 |
| 1 | ☑ | NOZZLE 1 ATTACHMENT POSITION MOVEMENT | MR000 ←▶ | MR010 ←▶ | ☐ 800 | ☐ 1200 | ☑ 15000 | ☑ 1500 |
| 2 | ☑ | NOZZLE 1 FALL | MR100 ←▶ | MR101 ←▶ | ☑ 800 | ☐ 1200 | ☑ 500 | ☑ 1500 |
| 3 | ☑ | NOZZLE 1 SUCTION ON | MR110 ←▶ | MR111 ←▶ | ☑ 800 | ☑ 1200 | ☑ 500 | ☑ 1500 |
| 4 | ☑ | NOZZLE 1 RISE | MR120 ←▶ | MR121 ←▶ | ☑ 800 | ☑ 1200 | ☑ 500 | ☑ 1500 |
| 5 | ☑ | NOZZLE 2 FALL | MR130 ←▶ | MR131 ←▶ | ☑ 800 | ☐ 1200 | ☑ 500 | ☑ 1500 |
| 6 | ☐ | | MR200 ←▶ | MR201 ←▶ | ☐ | ☐ | ☐ | ☐ |
| 7 | ☐ | | ←▶ | ←▶ | ☐ | ☐ | ☐ | ☐ |
| 8 | ☐ | | ←▶ | ←▶ | ☐ | ☐ | ☐ | ☐ |

SETTING  OPERATION STATE: MONITORING  THRESHOLD COLLECTIVE SETTING

+ ADD  × DELETE  ← →  REFLECT SETTING  CANCEL

SETTING DEVICE THAT SETS A PROGRAMMABLE LOGIC CONTROLLER AND PLC SYSTEM THAT COLLECTS CONTROL DATA AND A DASHBOARD FOR DISPLAYING CONTROL DATA

CROSS-REFERENCE TO RELATED APPLICATIONS

The present application claims foreign priority based on Japanese Patent Application No. 2019-183253, filed Oct. 3, 2019, and No. 2020-111876, filed Jun. 29, 2020, the contents of which are incorporated herein by references.

BACKGROUND OF THE INVENTION

1. Field of the Invention

The present invention relates to a setting device for a programmable logic controller and a PLC system.

2. Description of Related Art

A programmable logic controller (PLC) is a controller that controls industrial machines such as a manufacturing apparatus, a conveyance apparatus, and an inspection apparatus in factory automation (Japanese Patent No. 5661222 (Patent Literature 1) and JP-A-2018-097662 (Patent Literature 2)).

The PLC executes a control program such as a ladder program created by a programmer to control various extension units and controlled apparatuses.

Since the industrial machines include consumable components, when the consumable components are deteriorated, the yield of products decreases. Therefore, it is requested to appropriately replace the consumable components. For example, if control data, control results, and the like held by the PLC can be collected and displayed, this is useful for a person in charge of site management, who is left with monitoring of the operation of the industrial machines, in finding and preventing errors.

Incidentally, the programmer, who creates the control program, and a person in charge (the person in charge of site management), who operates and monitors the industrial machines in a factory where the industrial machines are set, respectively belong to different internal organizations. Therefore, it is not easy to establish mutual understanding. For example, even if the person in charge of site management desires to change control data, which the person in charge of site management desires to check, or change a graph or the like for displaying data, the person in charge of site management cannot change the control program. Therefore, the person in charge of site management has to convey a demand and wait for improvement of the control program. In some case, various kinds of work such as securing of an improvement budget occur. A large number of days elapse from the demand until the improvement is completed. Therefore, it would be convenient if a person not having knowledge of programming like the person in charge of site management can easily improve a data utilization program such as a flow program for collecting display data and a dashboard, which is a UI (user interface) for displaying the display data. This may also be convenient for the programmer who creates the control program.

SUMMARY OF THE INVENTION

Therefore, an object of the present invention is to facilitate work for creating a data utilization program for collecting control data held by a PLC and a dashboard for displaying the control data.

The present invention provides, for example, a setting device that sets a programmable logic controller, the programmable logic controller including: a first executing section configured to execute a control program; a storing section, which is a memory region or a variable that the first executing section accesses according to the control program; a collecting section configured to collect data designated as a collection target from the storing section; a second executing section configured to execute, according to a data utilization program, predetermined data processing on time-series data respectively collected at different timings from the storing section; a generating section configured to generate display data of a dashboard for displaying an execution result of the data utilization program; and a providing section configured to provide the display data to an external computer, the setting device including: a storing section configured to store templates of display data of a plurality of the dashboards and templates of a plurality of the data utilization programs; a first receiving section configured to receive selection of one dashboard among the plurality of dashboards; a second receiving section configured to receive designation of the collection target data by the collecting section; a creating section configured to create setting data including a set of the template of the selected dashboard and the template of the data utilization program linked with the selected dashboard in order to display, with the selected dashboard, display target data, which is data calculated by executing the predetermined data processing of the collection target data according to the data utilization program; and a transferring section configured to transfer the setting data to the programmable logic controller, wherein the second executing section executes, based on the setting data, the predetermined data processing on the collection target data to generate the display target data, and the display target data is linked with a graph display component included in the template of the display data of the selected dashboard.

According to the present invention, work for creating a data utilization program for collecting control data held by a PLC and a dashboard for displaying the control data is facilitated.

BRIEF DESCRIPTION OF THE DRAWINGS

FIG. 16 is a diagram for explaining a setting screen for an application;

FIG. 18 is a diagram for explaining a dashboard display screen for setting;

DESCRIPTION OF EMBODIMENTS

Figure 1:
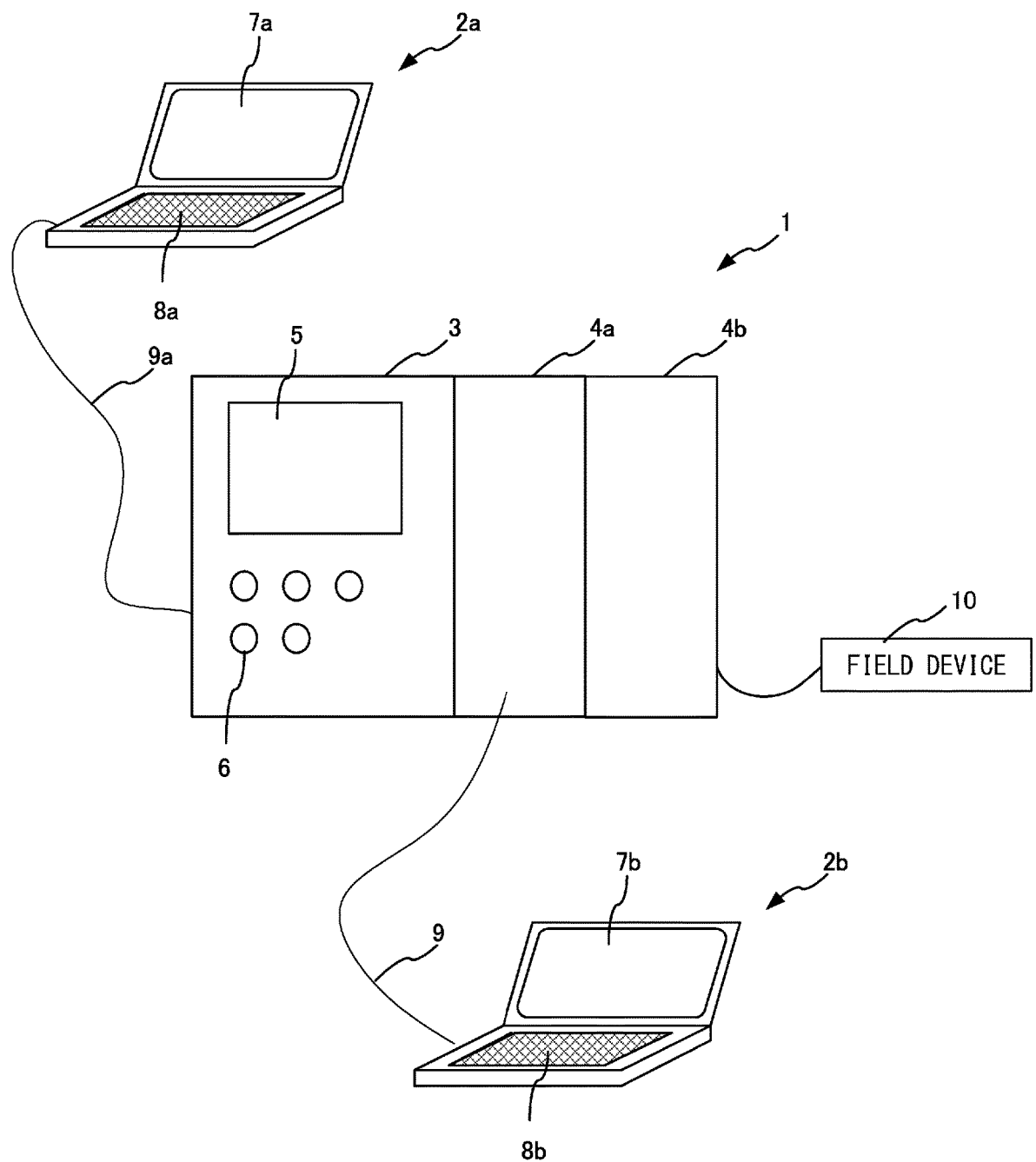
FIG. 1 is a diagram showing a PLC system.

An embodiment is explained in detail below with reference to the accompanying drawings. Note that the embodiment explained below does not limit the invention relating to the claims and not all of combinations of characteristics explained in the embodiment are essential for the invention. Two or more characteristics among a plurality of characteristics explained in the embodiment may be optionally combined. The same or similar components are denoted by the same reference numerals and redundant explanation of the components is omitted. Lower case alphabets are sometimes added to the ends of the reference numerals indicating the same or similar components. When matters common to a plurality of components are explained, the lower case alphabets are omitted.

System Configuration

First, to facilitate understanding of a programmable logic controller (PLC, or may be simply called programmable controller) by those skilled in the art, the configuration and the operation of a general PLC are explained below.

FIG. 1 is a conceptual diagram showing a configuration example of a programmable logic controller system according to an embodiment of the present invention. As shown in FIG. 1, this system includes a PC 2a for performing editing of a user program such as a ladder program and a PLC (programmable logic controller) 1 for collectively controlling various control devices set in a factory or the like. PC is an abbreviation of a personal computer. The user program may be created using a graphical programing language such as a motion program of a flowchart format such as a ladder language or an SFC (sequential function chart) or may be created using a high-level programming language such as a C language. In the following explanation, for convenience of explanation, the user program is a ladder program. The PLC 1 includes a basic unit 3 incorporating a CPU and one or a plurality of extension units 4. The one or the plurality of extension units 4 are detachably attachable to the basic unit 3.

The basic unit 3 includes a display section 5 and an operation section 6. The display section 5 can display operation states and the like of the extension units 4 attached to the basic unit 3. The display section 5 switches display content according to operation content of the operation section 6. The display section 5 usually displays a present value (a device value) of a device in the PLC 1, information concerning an error that occurs in the PLC 1, and the like. The device is a name indicating a region on a memory provided to store the device value (device data) and may be called device memory as well. The device value is information indicating an input state from an input device, an output state to an output device, and states of an internal relay (an auxiliary relay), a timer, a counter, a data memory, and the like set on a user program. Types of the device value include a bit type and a word type. A bit device stores a one-bit device value. A word device stores a one-word device value.

The extension units 4 are prepared to extend a function of the PLC 1. Field devices (controlled devices) 10 corresponding to functions of the extension units 4 are sometimes connected to the extension units 4. Consequently, the field devices 10 are connected to the basic unit 3 via the extension units 4. The field devices 10 may be input devices such as sensors or cameras or may be output devices such as actuators. A plurality of field devices may be connected to one extension unit 4.

For example, an extension unit 4b may be a positioning unit that drives a motor (the field device 10) to position work or may be a counter unit. The counter unit counts a signal from an encoder (the field device 10) such as a manual pulser.

An extension unit 4a is a data collection unit that executes a flow to collect collection target data from the basic unit 3 and the extension unit 4b, applies data processing to the collection target data to create display target data, and creates display data for displaying a dashboard on a display section 7 or a PC 2. The basic unit 3 is sometimes called CPU unit as well. Note that the system including the PLC 1 and the PC 2 may be called programmable logic controller system.

A PC 2a is a computer mainly operated by a programmer. On the other hand, a PC 2b is a computer operated by a person in charge of site management. The PC 2a may be called program creation supporting device (setting device) as well. A PC 2 is, for example, a portable notebook or tablet personal computer or a smartphone and is an external computer including the display section 7 and an operation section 8. The external computer is a computer present on the outside of the PLC 1. A ladder program, which is an example of a user program for controlling the PLC 1, is created using the PC 2a. The created ladder program is converted into a mnemonic code in the PC 2a. The PC 2 is connected to the basic unit 3 of the PLC 1 via a communication cable 9 such as a USB (Universal Serial Bus) cable. For example, the PC 2a sends the ladder program converted into the mnemonic code to the basic unit 3. The basic unit 3 converts the ladder program into a machine code and stores the machine code in a memory included in the basic unit 3. Note that, although the mnemonic code is transmitted to the basic unit 3, the present invention is not limited to this. For example, the PC 2a may convert the mnemonic code into an intermediate code and transmit the intermediate code to the basic unit 3.

Note that, although not shown in FIG. 1, the operation section 8 of the PC 2 may include a pointing device such as a mouse connected to the PC 2. The PC 2 may be detachably connected to the basic unit 3 of the PLC 1 via another communication cable 9 other than a USB cable. The PC 2 may be connected to the basic unit 3 of the PLC 1 by wireless communication not via the communication cable 9.

Program Creation Supporting Device

Figure 2:
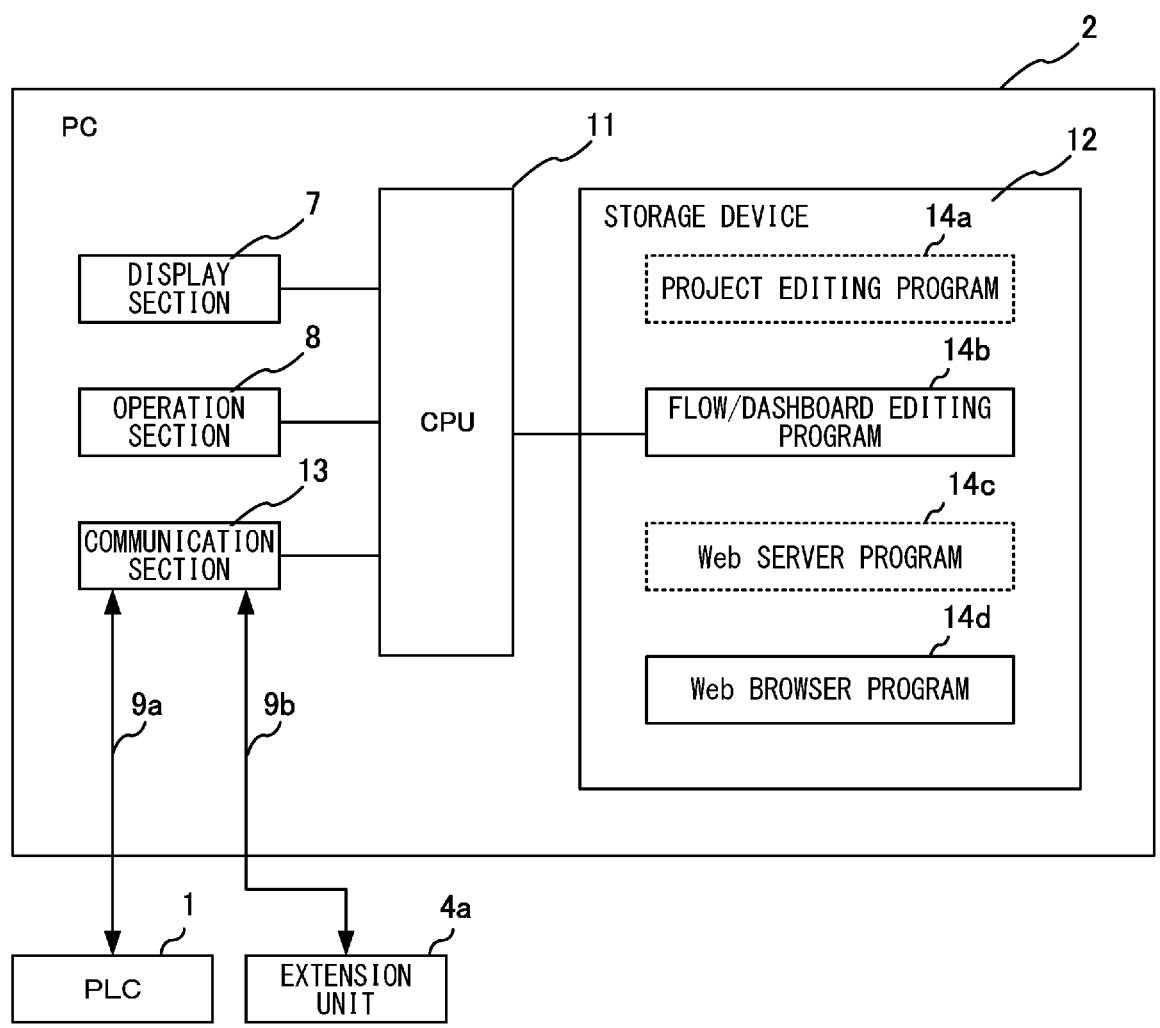
FIG. 2 is a diagram for explaining a PC.

FIG. 2 is a block diagram for explaining an electric configuration of the PC 2. As shown in FIG. 2, the PC 2 includes a CPU 11, a display section 7, an operation section 8, a storage device 12, and a communication section 13. The display section 7, the operation section 8, the storage device 12, and the communication section 13 are respectively electrically connected to the CPU 11. The storage device 12 includes a RAM, a ROM, a HDD, and an SSD and may further include a detachable memory card. The CPU is an abbreviation of central processing unit. The ROM is an abbreviation of read only memory. The RAM is an abbreviation of random access memory. The HDD is an abbreviation of hard disk drive. The SSD is an abbreviation of solid-state drive.

A user of the PC 2a causes the CPU 11 to execute a project editing program 14a stored in the storage device 12 and edits project data through the operation section 8. The project data includes one or more user programs (for example, a ladder program) and configuration information of the basic unit 3 and the extension units 4. The configuration information is information indicating connecting positions of the plurality of extension units 4 to the basic unit 3 and functions (for example, a communication function and a positioning function) of the basic unit 3 and information indicating functions (for example, a photographing function) of the extension units 4 and the like. The editing of the project data includes creation and change (reediting) of the project data. The user can read out the project data stored in the storage device 12 and change the project data using the project editing program 14a according to necessity. The communication section 13 communicates with the basic unit 3 via a communication cable 9a. The CPU 11 transfers the project data to the basic unit 3 via the communication section 13. The communication section 13 communicates with the extension unit 4a via a communication cable 9b. The CPU 11 transfers setting data of a flow or a dashboard to the extension unit 4a via the communication section 13.

PLC

Figure 3:
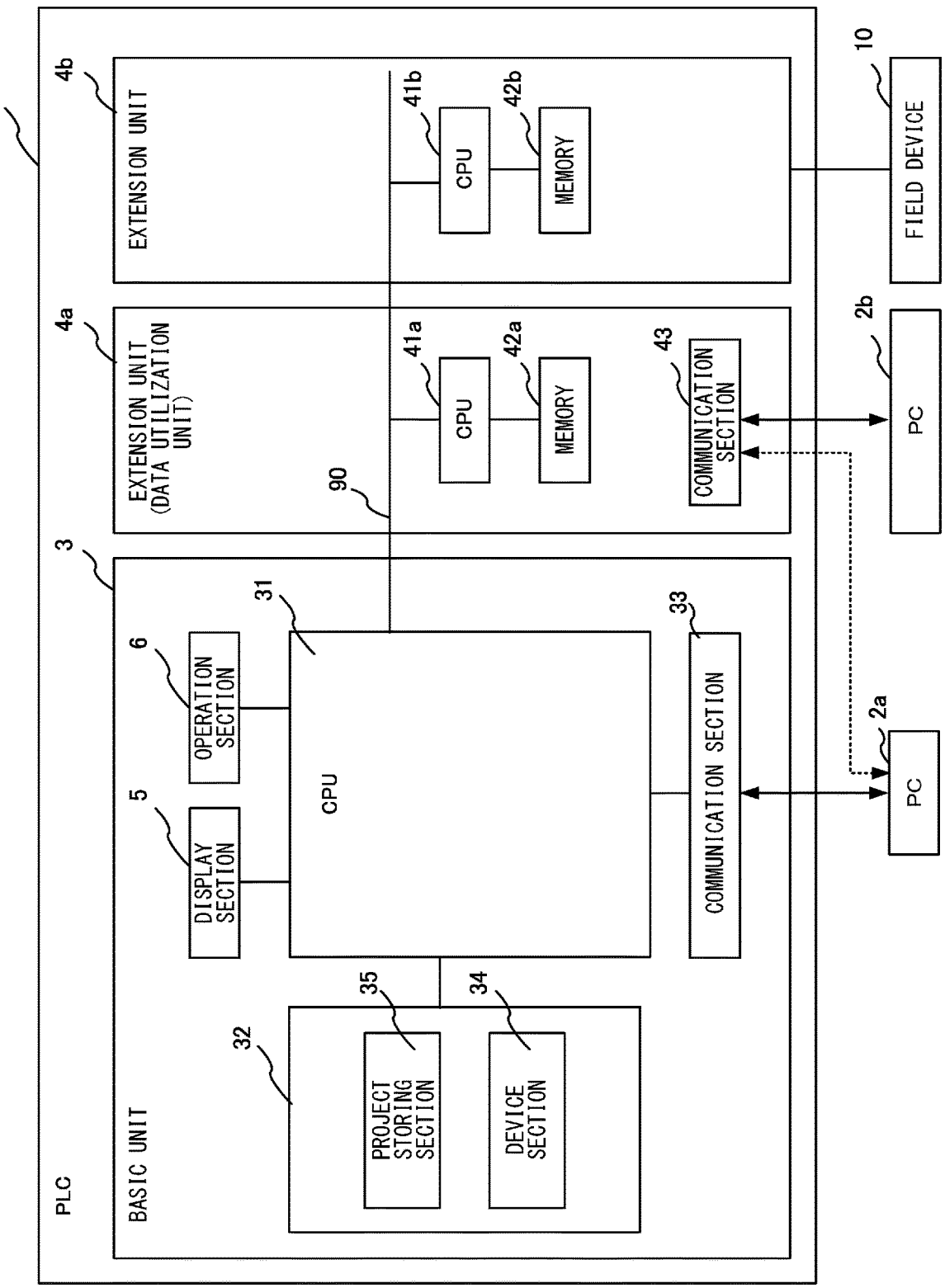
FIG. 3 is a diagram for explaining a PLC.

FIG. 3 is a block diagram for explaining an electric configuration of the PLC 1. As shown in FIG. 3, the basic unit 3 includes a CPU 31, the display section 5, the operation section 6, a storage device 32, and a communication section 33. The display section 5, the operation section 6, the storage device 32, and the communication section 33 are respectively electrically connected to the CPU 31. The storage device 32 may include a RAM, a ROM, and a memory card. The storage device 32 includes a plurality of memory regions such as a device section 34 and a project storing section 35. The device section 34 includes a bit device and a word device. The devices store device values. The project storing section 35 stores project data input from the PC 2a. The storage device 32 stores a control program for the basic unit 3 as well. As shown in FIG. 3, the basic unit 3 and the extension units 4 are connected via a unit internal bus 90, which is a type of an extension bus. Note that a communication function concerning the unit internal bus 90 is implemented in the CPU 31 but may be implemented as a part of the communication section 33. The communication section 33 may include a network communication circuit. The CPU 31 receives project data from the PC 2a via the communication section 33.

The unit internal bus 90 is supplementarily explained. The unit internal bus 90 is a communication bus used for input and output refresh. The input and output refresh is processing for updating a device value between the basic unit 3 and the extension units 4. The input and output refresh is executed every time a ladder program is executed once (that is, in every one scan).

The extension unit 4 includes a CPU 41 and a memory 42. A CPU 41b of the extension unit 4b controls the field device 10 according to an instruction (a device value) from the basic unit 3 stored in a device. The CPU 41b stores a control result of the field device 10 in a device called buffer memory. The control result stored in the device is transferred to the basic unit 3 by the input and output refresh. The control result stored in the device is transferred to the basic unit 3 according to a readout command from the basic unit 3 even at timing different from the input and output refresh. The memory 42 includes a RAM and a ROM. In particular, a memory region used as a buffer memory is secured in the RAM. The memory 42 may include a buffer that temporarily holds data (for example, still image data and moving image data) acquired by the field device 10.

A CPU 41a of the extension unit 4a functioning as a data utilization unit communicates with the PC 2a via the communication section 43 and the cable 9b. The data utilization unit is an extension unit that executes a data utilization application. The data utilization application includes a data utilization program (for example, a flow) for collecting control data and performing data processing and a dashboard that displays an execution result of the data utilization program. The flow is adopted as an example of the data utilization program. However, the data utilization program may be a user program by another language. The flow may include an arithmetic operation block for collecting data, an arithmetic operation block for executing data processing, and an arithmetic operation block for creating display data. The dashboard includes a graph display component and a numerical value display component. These display components may be realized by HTML data, CSS data, a Java Script (registered trademark) code, and the like. In this embodiment, the flow is realized by a flow template. The flow template is prepared in advance for each of applications. The flow template includes one or more arithmetic operation blocks in which parameters designated by the user are set. The dashboard is also realized by a template. The dashboard template includes one or more display components in which parameters designated by the user are set. The parameters are, for example, a variety of information such as a name of the dashboard, a device name, a numerical value, and a unit variable name. The unit variable is a variable for the extension unit 4a to hold an execution result of the flow.

The CPU 41a stores the setting data of the flow and the dashboard received from the PC 2a in a memory 42a. The CPU 41a executes the flow according to the setting data, collects a device value, and creates display data to be displayed on the dashboard. The CPU 41a communicates with the PC 2b via the communication unit 43 and the cable 9b. The CPU 41a transmits the display data of the dashboard to the PC 2b. Consequently, the PC 2b displays the dashboard including various data concerning the PLC 1.

Figure 4:
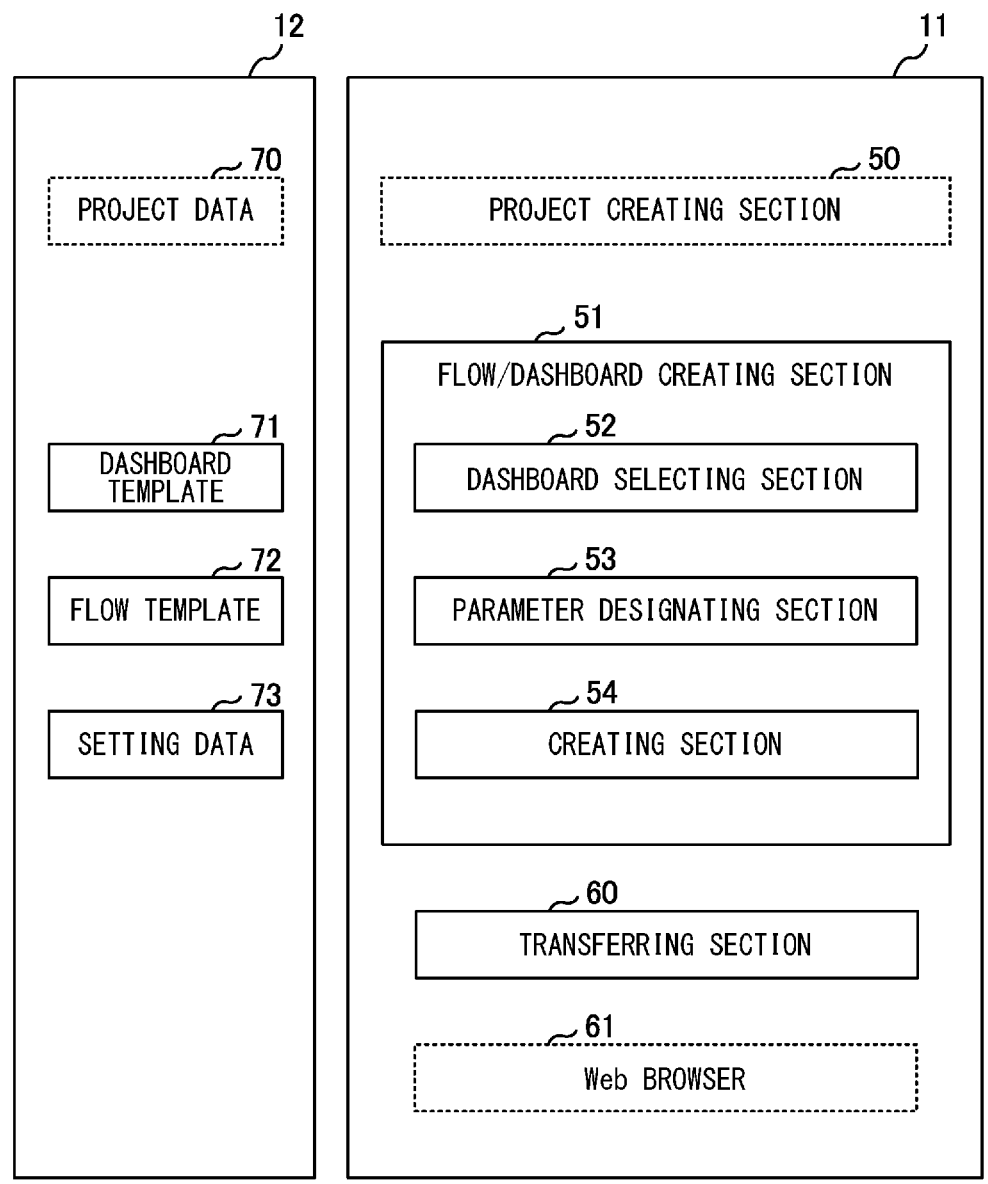
FIG. 4 is a diagram for explaining a setting device realized by the PC.

FIG. 4 is a diagram for explaining functions realized by the CPU 11 of the PC 2. A project creating section 50 is a function realized by the CPU 11 executing the project editing program 14a. The project creating section 50 creates project data 70 including a user program according to a user instruction input through the operation section 8.

A flow/dashboard creating section 51 is a function realized by the CPU 11 executing a flow/dashboard editing program 14b. A dashboard selecting section 52 displays, on the display section 7, a selection screen for supporting the user in selecting one dashboard from a plurality of dashboards and receives the selection of the dashboard by the user. As the dashboards, a dashboard for waveform monitoring, a dashboard for a loss analysis, a dashboard for FFT, and the like may be present. FFT is an abbreviation of fast Fourier transform. A parameter designating section 53 receives user designations about parameters concerning a flow associated with the dashboard selected by the user and parameters concerning display setting for the dashboard. The parameters are a collection target device, an analysis target device, an analysis target period, a display target, a name of a display component, a unit, and the like. A creating section 54 extracts, from a dashboard template 71, a template for displaying the dashboard selected by the user. The dashboard template 71 includes various display components (graph modules) for realizing the dashboard. The creating section 54 extracts, from a flow template 72, a template of a flow for executing data processing necessary for displaying data on the dashboard selected by the user. The flow template 72 includes an arithmetic operation component (a program module) for executing data processing. The creating section 54 creates setting data 73 including a template of a dashboard, a template of a flow, and parameters set in the templates and stores the setting data 73 in the storage device 12.

A transferring section 60 transfers the project data 70 to the basic unit 3 and transfers the setting data 73 to the extension unit 4a. A Web browser 61 is a function realized by the CPU 11 executing a Web browser program 14d. The Web browser 61 accesses a Web server of the extension unit 4a, acquires display data such as HTML data for displaying a dashboard, and displays the dashboard on the display section 7. The flow/dashboard editing program 14b may be created on a Web base. In this case, the CPU transmits, according to a Web server program 14c, data concerning a UI of the flow/dashboard editing program 14b to the Web browser 61. The CPU 11 passes a user instruction input via the Web browser 61 to the flow/dashboard editing program 14b via the Web server program 14c.

Figure 5:
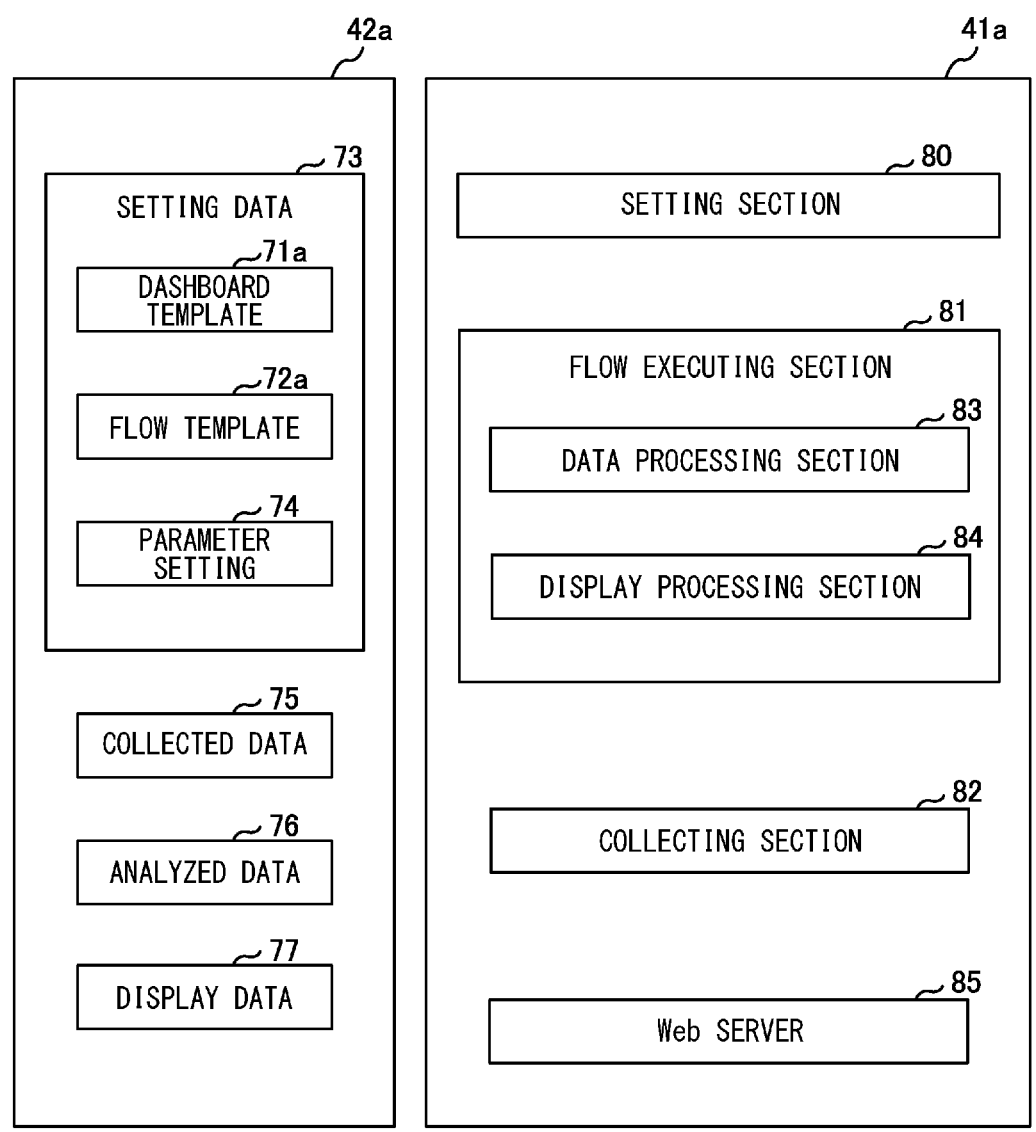
FIG. 5 is a diagram for explaining a data utilization unit.

FIG. 5 shows functions realized by the CPU 41a of the extension unit 4a. A setting section 80 stores the setting data 73 received from the PC 2a in the memory 42a. The setting section 80 may set, according to the setting data 73, what kind of a device value should be collected for the basic unit 3. The setting data 73 includes a dashboard template 71a, a flow template 72a, and parameter setting 74. The parameter setting 74 may be passed from the PC 2a to the extension unit 4a in a state in which the parameter setting 74 is substituted in the dashboard template 71a and the flow template 72a or may be passed from the PC 2a to the extension unit 4a in a state in which the parameter setting 74 is separated from the dashboard template 71a and the flow template 72a. A flow executing section 81 is a function realized by the CPU 41a executing a flow in the flow template 72a according to the parameter setting 74. A collecting section 82 collects, from the basic unit 3 and the extension unit 4b, a device value designated by the parameter setting 74, creates collected data 75, and stores the collected data 75 in the memory 42a. A data processing section 83 applies data processing designated by the parameter setting 74 to the collected data 75, creates analyzed data 76, and stores the analyzed data 76 in the memory 42a. A display processing section 84 creates, based on the dashboard template 71a designated by the parameter setting 74 and display target data, display data 77 of a dashboard (for example, HTML data or image data, a CSS (cascading style sheet), and a code of Java Script (registered trademark)). A Web server 85 provides the display data 77 of the dashboard to the Web browser 61 of the PC 2b or the like.

Flowchart

Setting (Creation) of a Dashboard and a Flow

Figure 6:
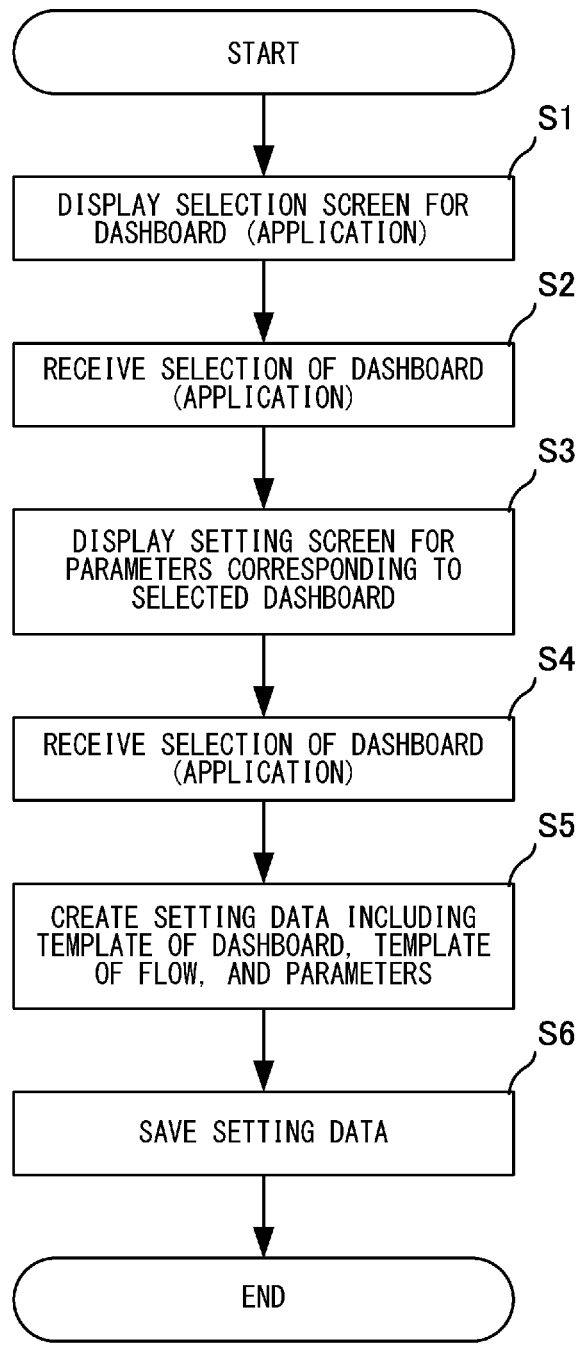
FIG. 6 is a flowchart showing a setting method for an application.

FIG. 6 is a flowchart showing setting processing executed by the CPU 11 of the PC 2a. The CPU 11 executes the following processing according to the flow/dashboard editing program 14b.

In S1, the CPU 11 displays a selection screen for a dashboard (an application) on the display section 7. The flow/dashboard creating section 51 displays a selection screen 100 illustrated in FIG. 7 on the display section 7. Note that, when the setting data 73 is already present, the following processing is equivalent to resetting processing.

Figure 7:
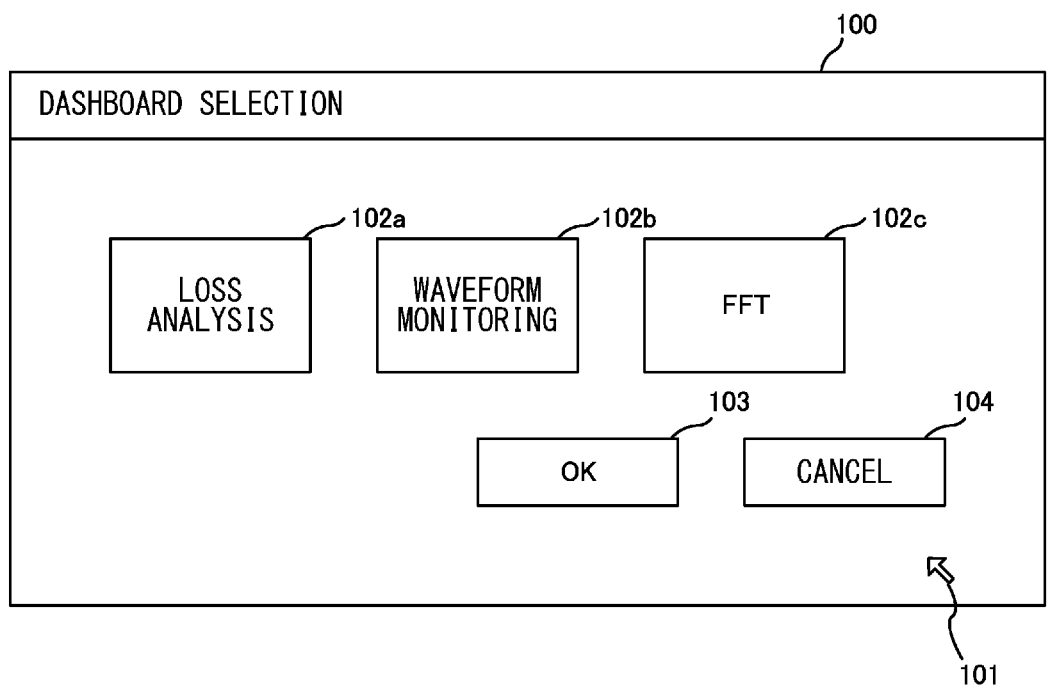
FIG. 7 is a diagram for explaining a selection screen for an application.

In FIG. 7, a pointer 101 is a display object that moves in association with operation of the pointing device such as the mouse. A selection button 102a for a loss analysis is a button for selecting a loss analysis application. A selection button 102b for waveform monitoring is a button for selecting a waveform monitoring application. A selection button 102c for FFT is a button for selecting an FFT application. Note that a plurality of applications may be selected by pressing a plurality of selection buttons. An OK button 103 is a button for deciding selection of a dashboard. A cancel button 104 is a button for cancelling selection of a dashboard. The user operates the pointer 101 to select any one of dashboards and depresses the OK button 103.

In S2, the CPU 11 receives selection of a dashboard. The dashboard selecting section 52 recognizes which selection button on the selection screen 100 is depressed by the pointer 101.

Figure 8:
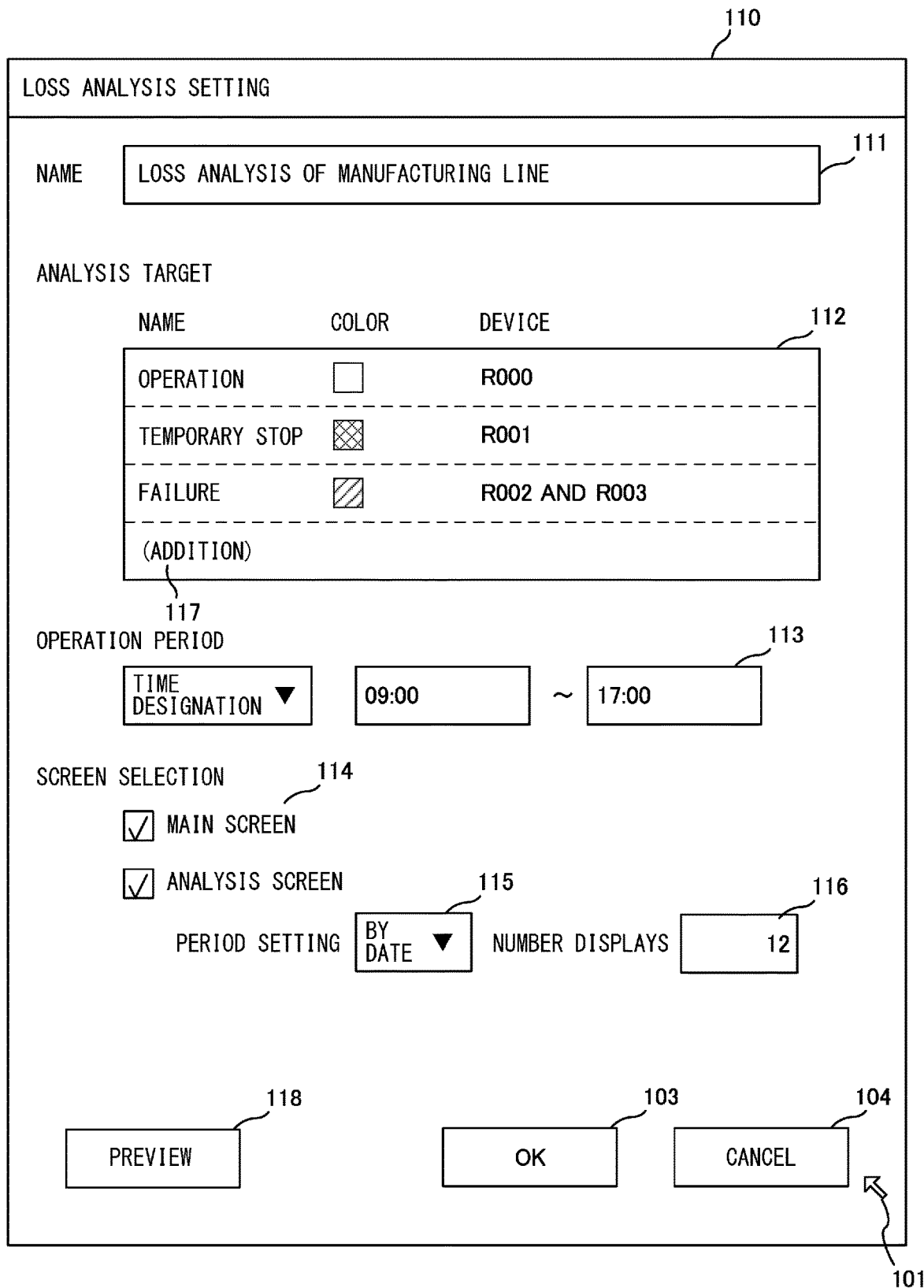
FIG. 8 is a diagram for explaining a setting screen for parameters.

In S3, the CPU 11 (the parameter designating section 53) displays, on the display section 7, a parameter setting screen corresponding to the selected dashboard. FIG. 8 illustrates a setting screen 110 for parameters about a loss analysis. In FIG. 8, a name box 111 is a text box in which a name displayed a dashboard for a loss analysis is input. An analysis-target setting section 112 receives input of device names set as analysis targets (for example, R000, R001, R002, and R003), display colors of the device names in graphs (for example, colors of bars of bar graphs), a name of an analysis target, and the like. A single device such as R000, which is an operation relay, or R001, which is a temporary stop relay, may be designated. Logical operation for a plurality of devices may be designated as in a failure relay. The operation relay is a bit device (a relay device) that is turned on when the PLC 1 is controlling an industrial machine and is turned off when the PLC 1 is not controlling the industrial machine. The temporary stop relay is a bit device that is turned on when the PLC 1 is temporarily stopped and is turned off when the PLC 1 is not temporarily stopped. The failure relay is a bit device that is turned on when the PLC 1 is out of order and is turned off when the PLC 1 is not out of order. The flow may monitor ON and OFF of these relays to calculate a time period in which the PLC 1 actually operated and a time period in which the PLC 1 is stopped. The analysis-target setting section 112 may receive resetting of a currently set device name (for example, R000) to another device name (for example, MR000). An operation-period setting section 113 receives an input of an operation period of a manufacturing line. A screen selecting section 114 is a checkbox for receiving selection of a display screen displayed as a dashboard. One dashboard is sometimes configured from a plurality of display screens (for example, a main screen and an analysis screen). For example, an operation ratio of the day is displayed on the main screen. Operation ratios in twelve days in the past may be comparably displayed on the analysis screen. A period setting section 115 is a list box for receiving setting of a unit of a collection period (for example, by time, day, week, or month) of data set as a display target. A number-of-displays setting section 116 is a numerical value box for receiving the number of displays of data. If the collection period is by date and the number of displays is 12, the dashboard displays data in twelve days for each of the days. When an additional object 117 is pressed, the parameter designating section 53 adds an analysis target device (for example, R004 indicating plan adjustment). A preview button 118 is a button for instructing the CPU 11 to display, on the display section 7, a preview of a dashboard.

In S4, the CPU 11 (the parameter designating section 53) receives, through the Web browser 61 and the Web server 85, designation of the parameters (the parameter setting 74) input through the setting screen 110.

In S5, the CPU 11 (the creating section 54) creates the setting data 73 including the template 71 of the selected dashboard, the template 72 of the flow corresponding to the dashboard, and the parameters input by the user. For example, when the dashboard for a loss analysis is selected, the creating section 54 sets the input parameters in a collection flow (for example, an equipment state update block) for collecting a device set as an analysis target. For example, as an operation period of the equipment state update block, start time (for example 09:00) and end time (for example, 17:30) set by the operation-period setting section 113 are set. As monitoring targets, the device names (for example, R000, R001, R002, and R003) and the like designated by the analysis-target setting section 112 are set. Note that default setting may be adopted as an output of the equipment state update block (temporary data passed to a loss analysis block). As the default setting, after a unit variable is created as a storage destination of temporary data, the created variable may be designated. Further, the creating section 54 sets input parameters in a data processing flow (for example, the loss analysis block) for executing data processing. Default setting (for example, machineStateTable) may be adopted as the input of the loss analysis block. A time operation ratio (for example, wOperationTimeRatio) and a performance operation ratio (for example, wPerformanceEfficiency) may be adopted as the output of the loss analysis block. In this way, the output of the equipment state update block and the input of the loss analysis block are the same variable. That is, the equipment state update block and the loss analysis block are associated (linked) via the same parameters.

In S6, the CPU 11 (the transferring section 60) transfers the setting data 73 to the extension unit 4a. Consequently, the setting data 73 is written in a ROM region of the memory 42a of the extension unit 4a.

Figure 9:
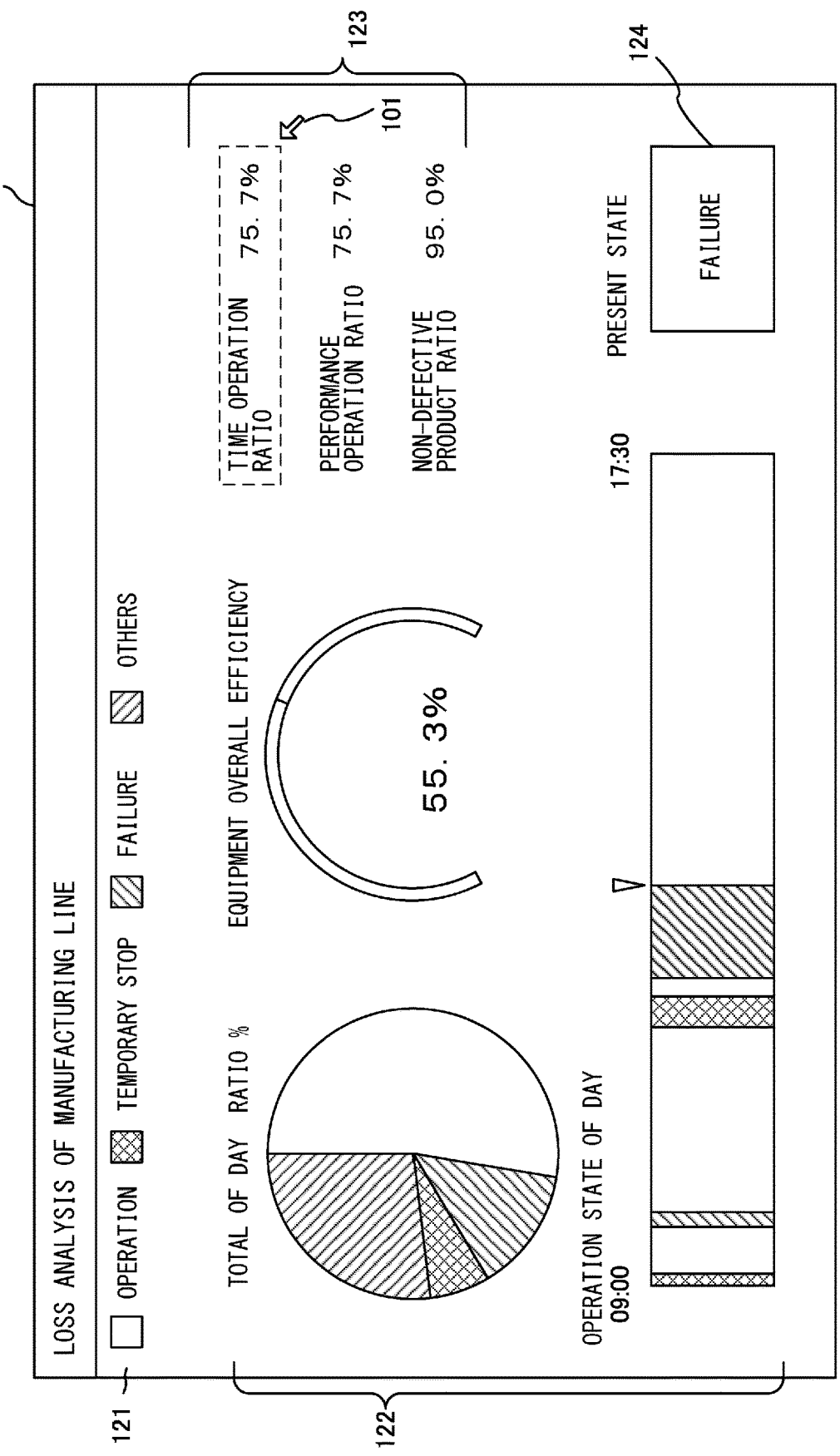
FIG. 9 is a diagram for explaining collection and display of data.

FIG. 9 shows an example of a dashboard 120. In FIG. 9, an explanatory note section 121 indicates a color allocated to an analysis target device. A graph section 122 includes one or more graphs for displaying a result of a loss analysis. A type of a graph is prepared in advance for each of dashboards. An analysis-result display section 123 displays an arithmetic operation result of the loss analysis. The display target displayed on the analysis-result display section 123 is also prepared in advance for each of the dashboards. A present-state display section 124 shows a present state of the PLC 1.

When preview of the dashboard 120 is instructed by the preview button 118, the CPU 11 may display a graph and a numerical value using default data for preview prepared in advance. The creating section 54 may receive customization of the dashboard 120 according to operation of the pointer 101 on the dashboard 120 for preview. For example, in FIG. 9, when the "time operation ratio" serving as the numerical value display component is double-clicked by the pointer 101 in FIG. 9, the CPU 11 may display a setting screen for the numerical value display component. On the setting screen, the CPU 11 may receive editing of a prefix character (for example, time operation ratio), a suffice character (for example, %), a reference device/unit variable (for example, wOperationTimeRatio), and the like of the numerical value display component.

Figure 10:
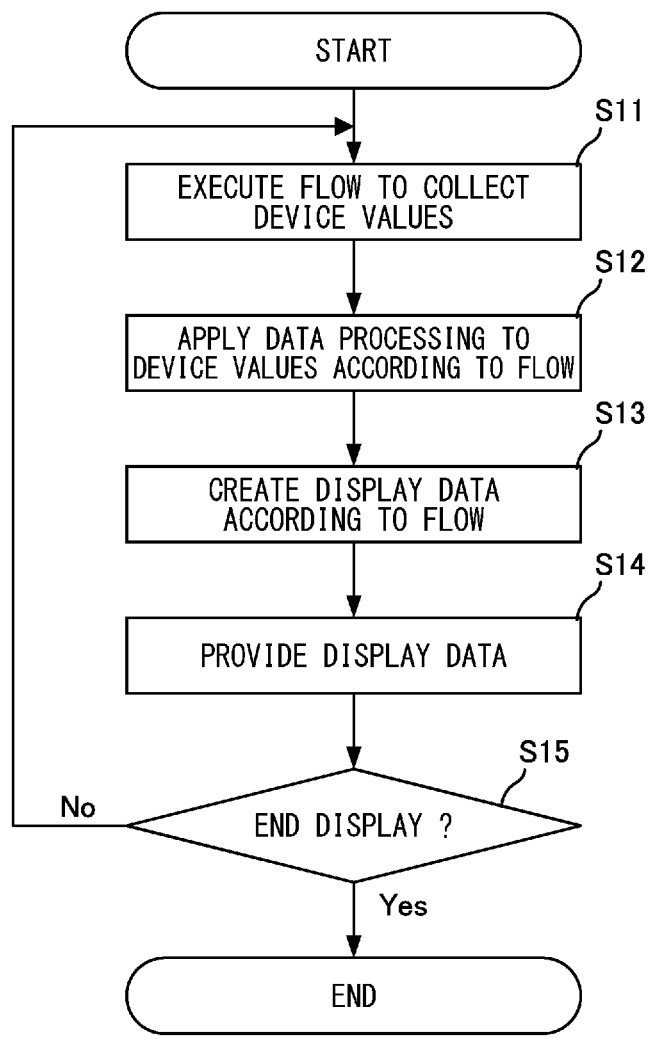
FIG. 10 is a diagram for explaining a dashboard.

Execution of a flow and provision of a dashboard FIG. 10 is a flowchart showing execution of a flow and provision of a dashboard executed by the CPU 41a of the extension unit 4a.

In S11, the CPU 41a (the collecting section 82 of the flow executing section 81) executes the flow (for example, the equipment state update block) designated by the setting data 73 to thereby collect collection target device values (for example, R000, R001, R002, and R003) and stores the device values in the memory 42 as the collected data 75. The corrected data 75 may be time-series data collected at different times.

In S12, the CPU 41a (the data processing section 83) applies data processing (for example, calculation of a time operation ratio, a performance operation ratio, a non-defective product ratio, and equipment overall efficiency) to the data 75 (the device value) collected according to the flow (for example, the loss analysis block) designated by the setting data 73.

Consequently, the analyzed data 76 is created and saved in the memory 42a.

In S13, the CPU 41a (the display processing section 84) creates, according to the flow, display data (for example, HTML data) for displaying the dashboard 120. The display processing section 84 creates display data using display target data such as the collected data 75 and/or the analyzed data 76.

In S14, the CPU 41a (the Web server 85) provides the display data to the PC 2b. The CPU 41a may display the display data on a display of the PLC 1.

In S15, the CPU 41a determines whether a display end is instructed from the PC 2b. If the display end is not instructed, the CPU 41a may repeat S11 to S14. If the display end is instructed, the CPU 41a ends the execution of the flow and the provision of the dashboard.

Figure 11:
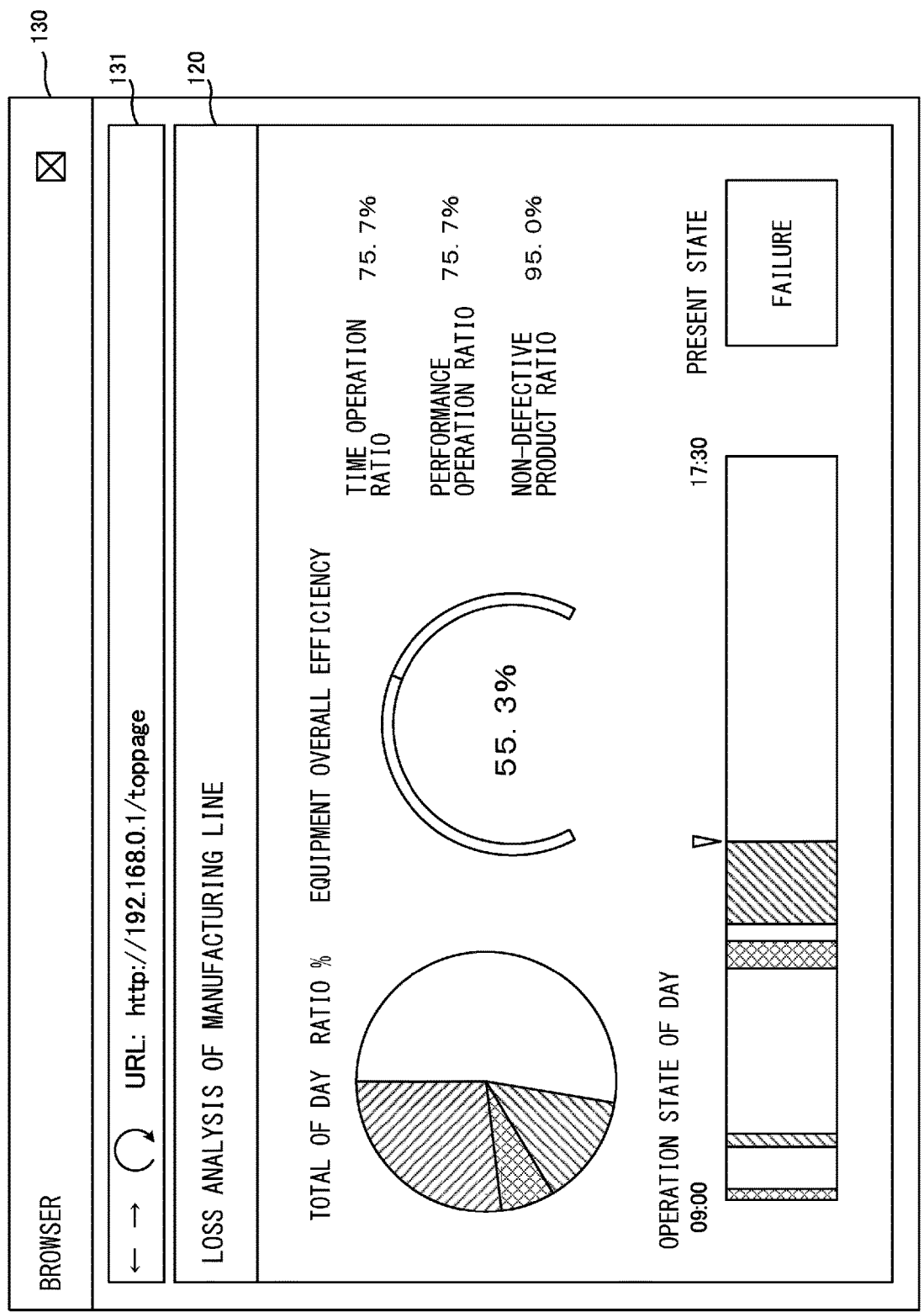
FIG. 11 is a diagram for explaining the dashboard displayed on a browser.

FIG. 11 shows a UI 130 of a Web browser displayed on the display section 7 of the PC 2b. A URL allocated to the Web server 85 of the extension unit 4a is input to a URL input section 131. The CPU 11 of the PC 2b accesses the Web server 85 of the extension unit 4a according to the input URL. The CPU 11 displays, on the UI 130 of the Web browser, display data (an HTML file, image data, or the like) of the dashboard 120 provided by the Web server 85.

Customization of Display Components of the Dashboard

Figure 12:
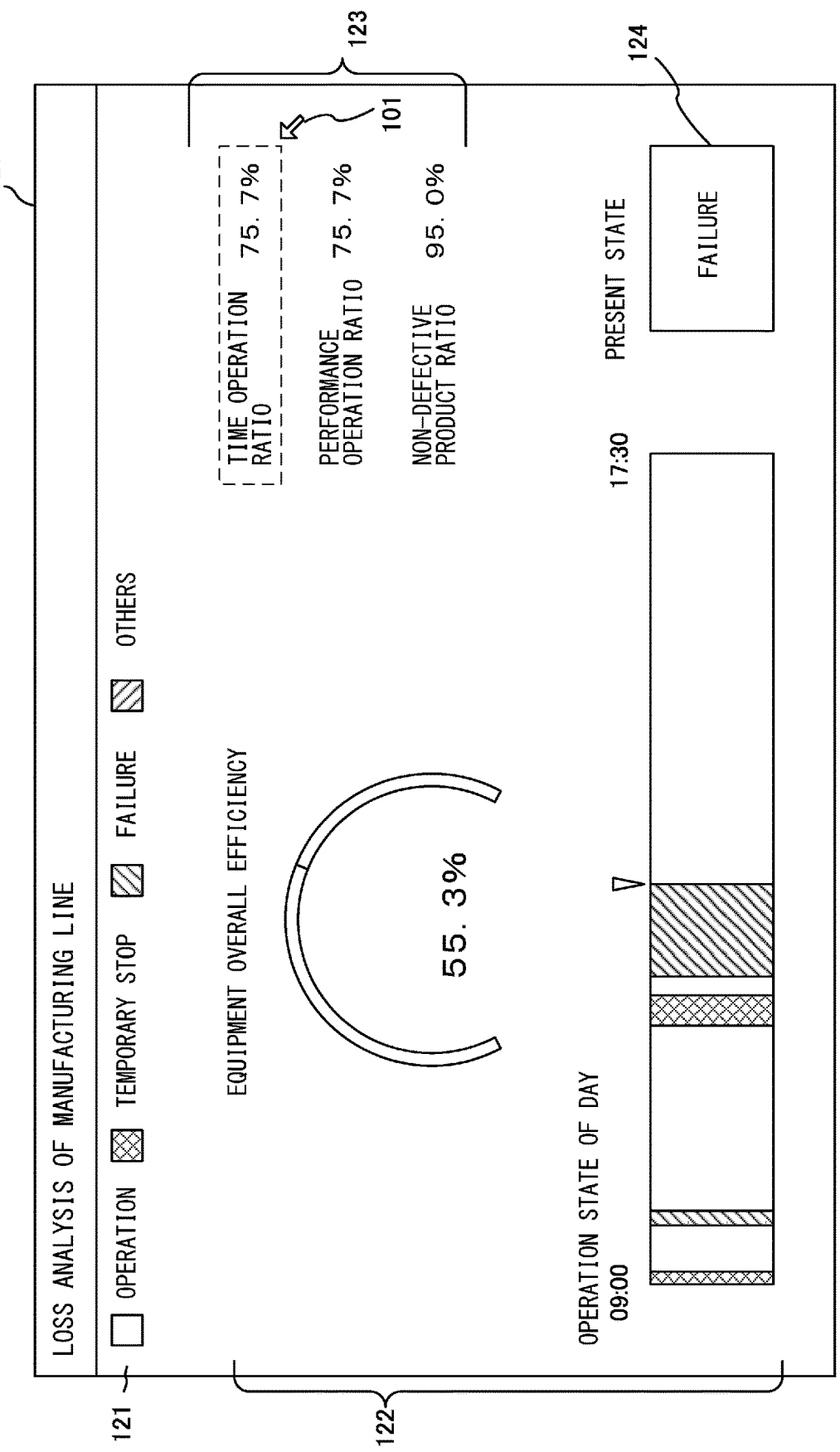
FIG. 12 is a diagram for explaining resetting of the dashboard.

As explained concerning FIG. 9, the creating section 54 may receive customization of the display components of the dashboard 120. When a pie graph shown in FIG. 9 is right-clicked by the pointer 101, the creating section 54 may display an editing menu. When graph deletion (component deletion) included in the editing menu is selected by the pointer 101, the CPU 11 may delete the right-clicked pie graph. FIG. 12 shows the dashboard 120 in which the pie graph is deleted. In this case, the creating section 54 updates the setting data 73 to delete or disable an arithmetic operation block for realizing the pie graph among the plurality of arithmetic operation blocks configuring the flow. In this way, the creating section 54 may reflect an editing result of the display components on the flow. Conversely, the creating section 54 may reflect an editing result of a flow block configuring the flow on the display components.

Such customization of the dashboard 120 may be executed through the UI 130 of the Web browser 61 shown in FIG. 11. The CPU 11 of the PC 2a may execute HTTP communication with the CPU 41a (the setting section 80) of the extension unit 4a to notify that the pie graph is right-clicked, receive display data of the editing menu from the Web server 85, and transmit an instruction for deletion to the setting section 80. The setting section 80 deletes or disables an arithmetic operation block corresponding to the pie graph among the plurality of arithmetic operation blocks configuring the flow. Consequently, the setting data 73 is updated.

Import of the Setting Data

The setting data 73 may be imported to another PLC 1. A plurality of manufacturing lines are sometimes operating in parallel in a factory. In this case, the PLCs 1 of the same type respectively control industrial machines in the plurality of manufacturing lines. Accordingly, the PC 2a may copy or import the setting data 73 created for a first PLC 1 to a second PLC 1. In this case, the CPU 11 may execute resetting (reediting) of the setting data 73 and then transfer the setting data 73 to the second PLC 1. As explained above, the device name concerning the operation may be changed from R000 to MR000 by the resetting.

When a specific data utilization application is already present in the second PLC 1, if the same data utilization application is imported from the first PLC 1, it is likely that, for example, overlap of unit variables occurs and the two data utilization applications do not normally operate. That is, if a unit variable (for example, wOperationTimeRatio) in the originally present setting data 73 and a unit variable (for example, wOperationTimeRatio) copied for the import overlap, the flow may not correctly operate in the second PLC 1. In this case, the CPU (the creating section 54) may change the unit variables (for example, change wOperationTimeRatio to wOperationTimeRatio2) to solve the overlap of the unit variables.

Combination of a Plurality of Dashboards

As explained above, a plurality of dashboards are sometimes selected. In this case, the plurality of dashboards, that is, a plurality of flows may cooperate. For example, the waveform monitoring application sometimes collects vibration data of an industrial machine and displays a waveform of the vibration data on a dashboard along a time axis. In this case, a flow relating to the waveform monitoring application collects the vibration data and holds the vibration data in the memory 42a. On the other hand, a flow of the FFT application may execute a frequency analysis by FFT about the vibration data. A dashboard of the FFT application displays a frequency analysis result of the vibration data. Note that the frequency analysis result is held in the memory 42a. Further, a flow of the loss analysis application may acquire a frequency analysis result of the last time and a frequency analysis result of this time from the memory 42a and calculate a difference between the frequency analysis results, compare the difference and a predetermined error threshold to calculate an analysis result about presence or absence of an error, and display the analysis result on a dashboard of the loss analysis application. In this way, the plurality of dashboards and the plurality of flows may cooperate. Note that the plurality of dashboards may be displayed side by side or may be displayed while being switched one by one according to operation of switching buttons provided in the dashboards.

A Change of the Setting Data 73 Following a Change of the Project Data 70

The creating section 54 may change the setting data 73 following a change of the project data 70. For example, R000 is already illustrated as the operation relay. When the project data 70 is changed, another device (for example MR000) is sometimes allocated as the operation relay. Therefore, the creating section 54 compares a time stamp of the setting data 73 and a time stamp of the project data 70 to determine whether the project data 70 has been changed after the setting data 73 was saved. When the project data 70 has been changed, further, the creating section 54 analyzes the project data 70 to determine whether allocation of a device relating to the setting data 73 has been changed. When detecting that the allocation of the device relating to the setting data 73 has been changed, the creating section 54 reflects the change of the project data 70 on the setting data 73 (for example, R000-MR000). Consequently, a work load of the user for resetting of the setting data 73 would be reduced.

Figure 14:
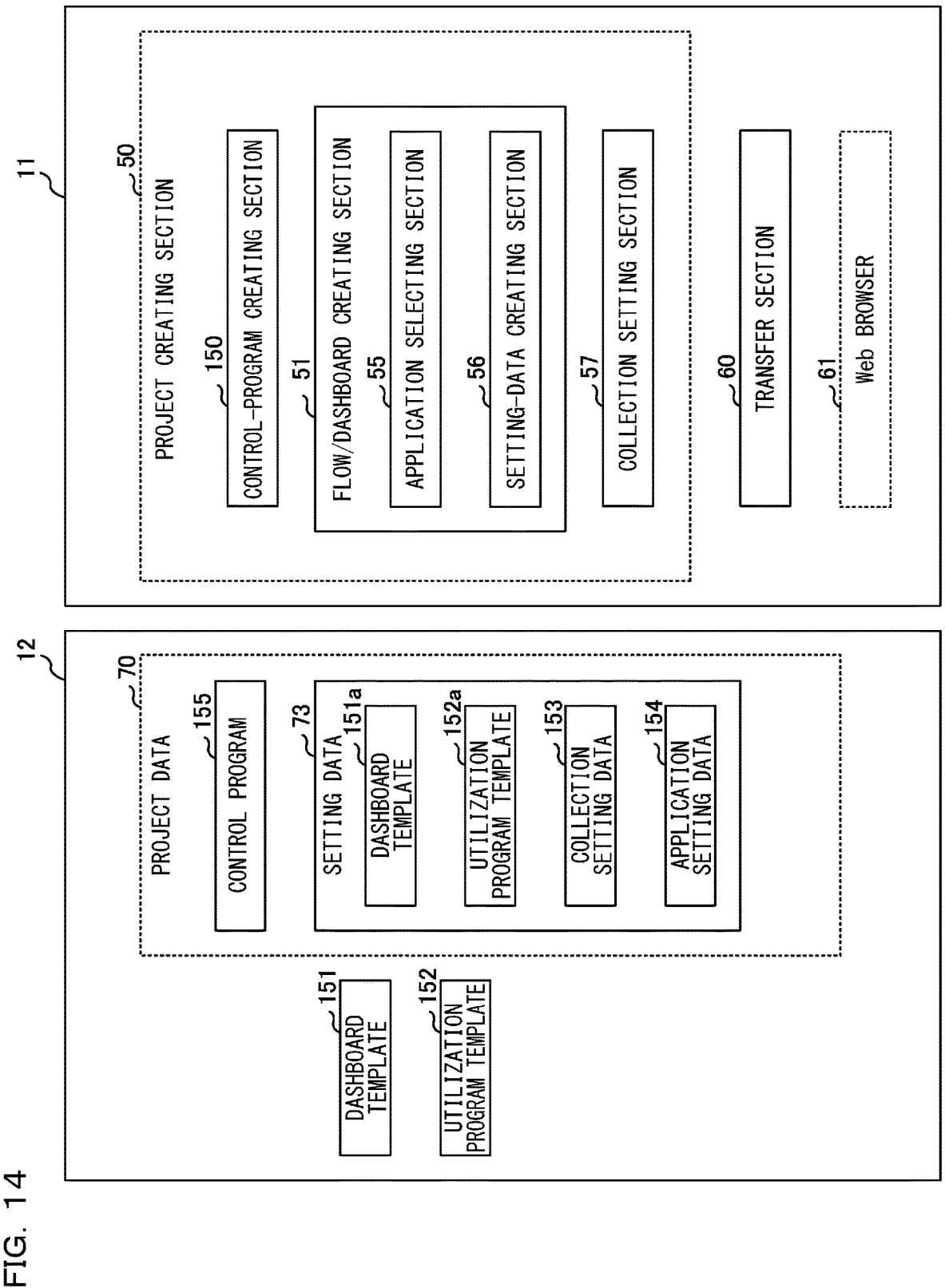
FIG. 14 is a diagram for explaining a setting device realized by a PC.

FIG. 14 is a diagram for explaining functions realized by the CPU 11 of the PC 2. The project creating section 50 is a function realized by the CPU 11 executing the project editing program 14a. The project creating section 50 includes a control-program creating section 150, the flow/dashboard creating section 51, and a collection setting section 57. The project creating section 50 creates the project data 70 including a user program such as a ladder program according to a user instruction input through the operation section 8.

The control-program creating section 150 creates, according to a user instruction input through the operation section 8, a control program 155 such as a ladder program executed by the CPU 31. The control program 155 is stored in the storage device 12 as a part of the project data 70.

The flow/dashboard creating section 51 is a function realized by the CPU 11 executing the flow/dashboard editing program 14b. The flow/dashboard creating section 51 includes an application selecting section 55 and a setting-data creating section 56. The application selecting section 55 displays, on the display section 7, a selection screen for supporting the user in selecting one application from a plurality of applications and receives the selection of the application by the user. As the applications, a real-time monitoring application for monitoring a device or a variable, which is a monitoring target, on a real time basis, an operation record analysis application for analyzing an operation record for reproducing an operation state of the PLC 1, and the like may be present.

As the real-time monitoring application, the following kinds of monitoring may be present.

(1) Waveform monitoring: A waveform (a monitoring target waveform), the amplitude of which changes within a range of an upper limit value to a lower limit value set in advance, is monitored (2) Timing monitoring: Timing of ON and/or OFF of a monitoring target bit device is monitored (3) Camera monitoring: It is monitored whether feature value data of a monitoring target camera image satisfies a preset detection condition (4) Cycle monitoring: A cycle operation means repeatedly executing a plurality of processes for each one cycle. In the cycle monitoring, a bit device indicating start timings of the respective plurality of processes forming the cycle operation and a bit device indicating end timings of the process are set as monitoring target devices. A time interval from a start to an end of a cycle overall operation and time intervals from starts to ends of processes in one cycle are monitored. The cycle overall operation indicates the entire one cycle.

The setting-data creating section 56 creates, according to a user instruction, application setting data 154 including parameters concerning a data utilization program associated with an application selected by the user and parameters concerning display setting for a dashboard. The parameters are a monitoring target device or variable, a monitoring item name (for example, a name of a process), a monitoring condition for monitoring targets, an analysis target file, an analysis target device, an analysis target period, a display target, a name of a display component, a unit, and the like. The setting-data creating section 56 extracts, from a dashboard template 151, as a dashboard template 151a of the setting data 73, a template for displaying a dashboard selected by the user. The dashboard template 151 includes various display components (graph modules) for realizing a dashboard. The setting-data creating section 56 extracts, from a utilization program template 152, as a utilization program template 152a of the setting data 73, a template of a data utilization program for executing data processing necessary for displaying data on the dashboard selected by the user. The utilization program template 152 includes an arithmetic operation component (a program module) for executing the data processing. The setting-data creating section 56 creates the setting data 73 including a template of a dashboard, a template of a data utilization program, and the application setting data 154 set in these templates and stores the setting data 73 in the storage device 12. Note that the setting-data creating section 56 may create collection setting data 153 including a collection target device or variable and a collection condition.

The collection setting section 57 defines a collecting operation for a device or a variable according to a user instruction. Further, the collection setting section 57 creates the collection setting data 153 including a collection target device or variable and a collection condition. The collection setting data 153 may be included in the setting data 73.

The transferring section 60 transfers the project data 70 to the basic unit 3 and transfers the setting data 73 to the extension unit 4a. The Web browser 61 is a function realized by the CPU 11 executing the Web browser program 14d.

Figure 15:
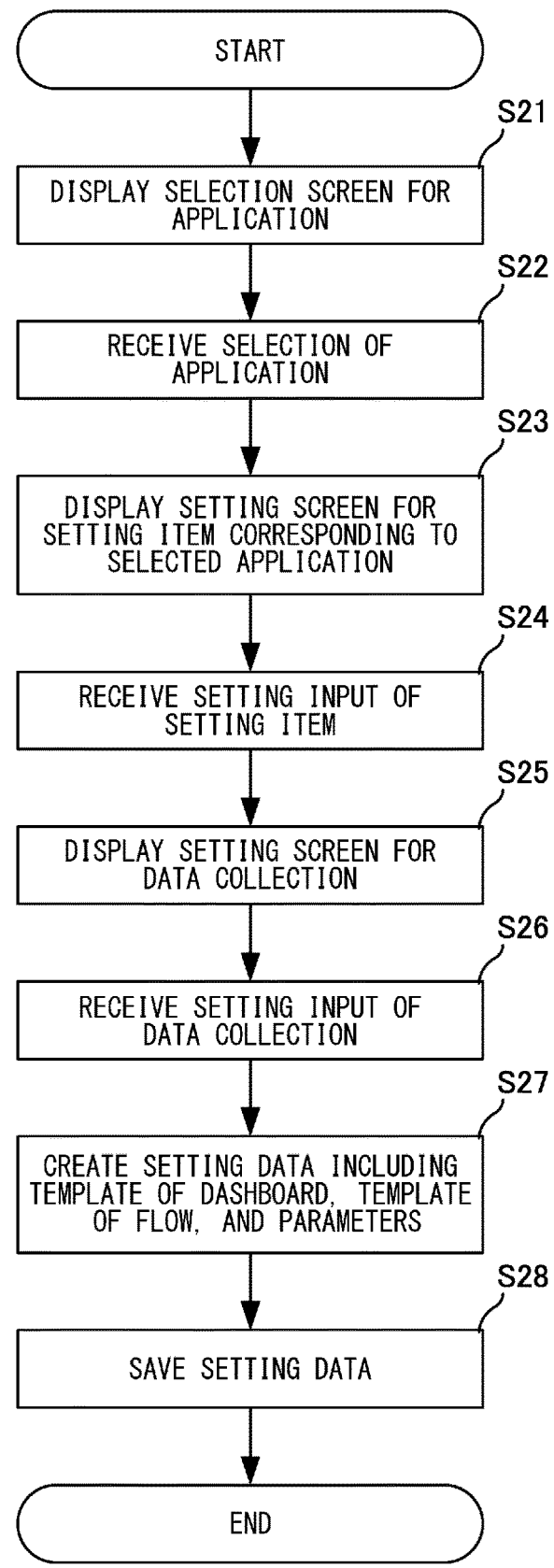
FIG. 15 is a flowchart showing a setting method for an application.

FIG. 15 is a flowchart showing setting processing executed by the CPU 11 of the PC 2a. The CPU 11 executes the following processing according to the flow/dashboard editing program 14b.

In S21, the CPU 11 (the application selecting section 55) displays an application selection screen on the display section 7. The application selecting section 55 displays a selection screen for the real-time monitoring application and the operation record analysis application on the display section 7. Note that, when the setting data 73 is already present, the following processing is equivalent to the resetting processing.

In S22, the CPU 11 (the application selecting section 55) receives selection of an application. The application selecting section 55 recognizes which selection button on the selection screen is depressed by a pointer or the like. Selection buttons are associated with the respective plurality of applications. That is, the application selecting section 55 recognizes an application corresponding to the pressed selection button.

In S23, the CPU 11 (the setting-data creating section 56) displays, on the display section 7, a setting screen for the application setting data 154 (a setting item) corresponding to the selected application. FIG. 16 illustrates a setting wizard 161, which is a setting screen for application setting data about cycle monitoring. In FIG. 16, a monitoring checkbox 162a is a checkbox to which a check indicating selection as a monitoring target by the user is given. Input fields 162b to 162f are respectively input fields to which an item name, a start condition, an end condition, an attention value, and a warning value are input. The item name is a name given to a process. The start condition is a change (falling/rising) of a signal (a relay device or a variable) serving as a start condition for processes. The end condition is a change (falling/rising) of a signal (a relay device or a variable) serving as an end condition for processes. The attention value is an upper limit value and a lower limit value defined as an attention state. The warning value is an upper limit value and a lower limit value defined as a warning state. The upper limit value and the lower limit value may be called thresholds as well. Processes in a cycle and setting input rows 163 correspond. A monitoring item is set for each of the setting input rows 163. The start condition and the end condition are set by a device or a variable that specifies start timings and end timings of the processes in the cycle. The device or the variable that specifies the timings and a condition that specifies timing are set as the start condition and the end condition. The condition that specifies timing is, for example, rising timing. The attention value and the warning value are respectively set by the upper limit values and/or the lower limit values. When a check is given to a checkbox corresponding to a set threshold, the set threshold is enabled. An OK button 164 is a button for the user to instruct setting completion. A cancel button 165 is a button for instructing cancellation of a setting change input by the user.

In S24, the CPU 11 (the setting-data creating section 56) receives designation of the application setting data 154 input through the setting wizard 161. For example, the setting-data creating section 56 receives a setting input of setting items.

In S25, the CPU 11 (the collection setting section 57) displays a setting screen for data collection on the display section 7. In S26, the CPU 11 (the collection setting section 57) receives designation (a setting input) of the collection setting data 153 such as a collection target device or variable and a collection condition input through the setting screen for data collection. Note that, when the collection setting data 153 is set by the application setting data 154, S25 and S26 are not always necessary.

In S27, the CPU 11 (the setting-data creating section 56) creates the setting data 73 including the template 151a of the selected dashboard, the template 152a of a data utilization program corresponding to the dashboard, and the application setting data 154 and the collection setting data 153 input by the user.

In S28, the CPU 11 (the setting-data creating section 56) saves the setting data 73 in the storage device 12. The CPU 11 (the setting-data creating section 56) may save, as a part of the project data 70 including the control program 155, the setting data 73 including the dashboard template 151a, the utilization program template 152a, the collection setting data 153, and the application setting data 154. The CPU 11 (the transferring section 60) transfers the setting data 73 to the extension unit 4a as a part of the project data 70. Consequently, the setting data 73 is written in the ROM region of the memory 42a of the extension unit 4a. In order to set an application selected using the application setting data 154, which is a part of the project data 70, the project data 70 is sometimes read out from the PLC 1. In this case, the application setting data 154 may be read out together with the control program 155 and the data utilization program. The PC 2a may collate the application setting data 154 saved in the PC 2a and the application setting data 154 saved in the PLC 1 and display a collation result. Accordingly, for example, after the application setting data 154 written in the PLC 1 is rewritten in the PLC 1, when the application setting data 154 is read out from the PLC 1 to the PC 2a again, the PC 2a may confirm the application setting data 154 after being rewritten.

Figure 17:
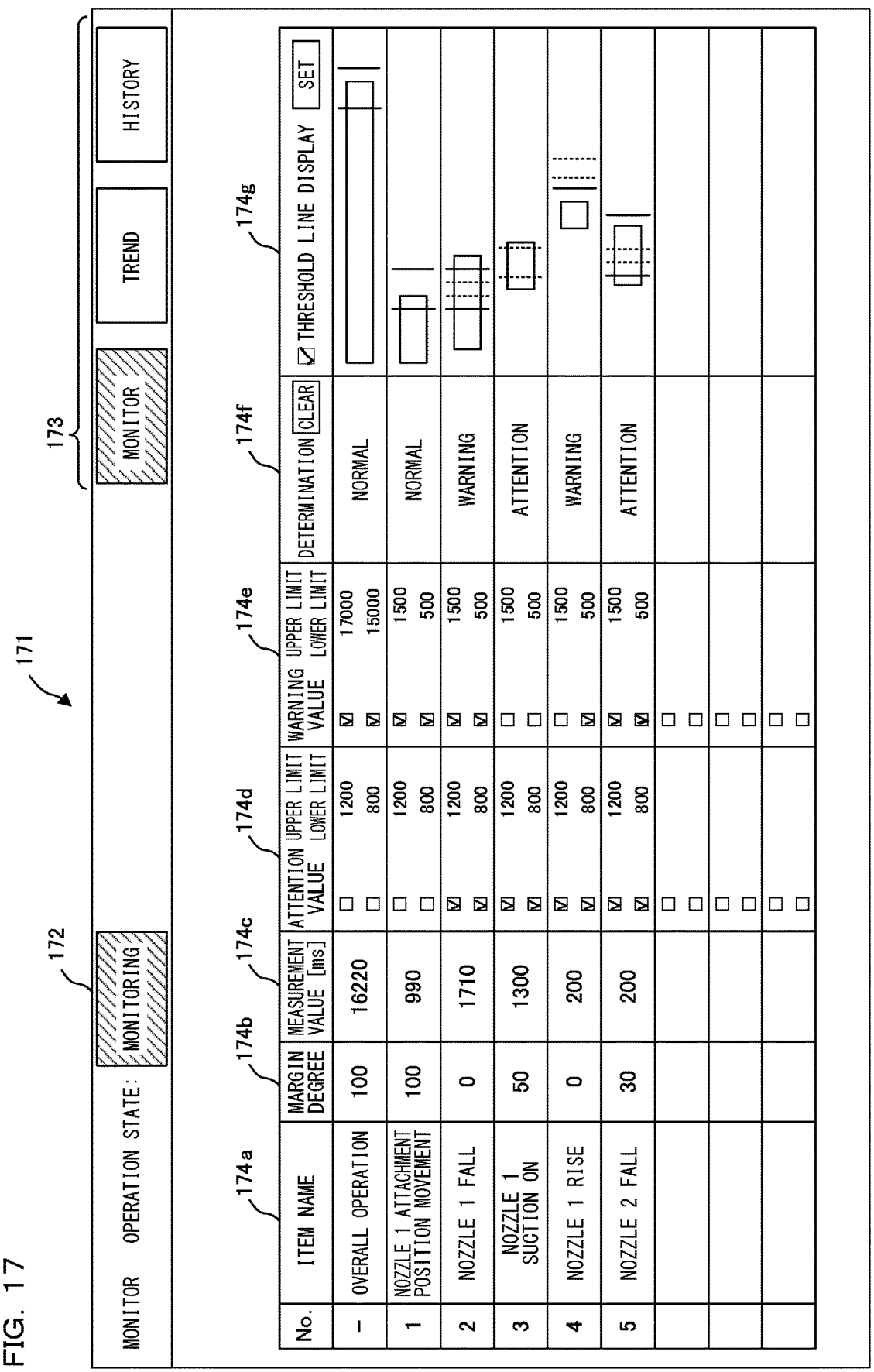
FIG. 17 is a diagram for explaining a dashboard display screen for state monitoring.

FIG. 17 shows an example of a dashboard 171 for the real-time monitoring application. In FIG. 17, operation state display 172 shows an operation state of real-time monitoring. A display switching tab 173 is tab button display for, when a plurality of dashboards are set for an application, switching a dashboard to another dashboard corresponding to the application. In FIG. 17, a state in which a monitor button is pressed is shown. In this state, when a trend tab is pressed, the dashboard is switched to a dashboard of trend display. When a history tab is pressed, the dashboard is switched to a dashboard for history display. In display fields 174a to 174g an item name, a margin degree, a measurement value, an attention value, a warning value, a determination result, and a graph relating to the measurement value are displayed for each of monitoring items. The item name, the attention value, and the warning value are displayed based on the application setting data 154. The measurement value indicates a time width from the start timing to the end timing determined based on the start condition and the end condition of the application setting data 154. The margin degree indicates to which degree the measurement value of the monitoring item has a margin. For example, the margin degree may indicate to which degree the measurement value has a margin with respect to the waring value or the attention value. The determination result is a determination result calculated based on the measurement value and an effective warning value or attention value. The determination result may indicate state classes of a monitoring target such as normal, attention, and warning. Note that, even if a determination result based on the latest measurement value is normal, a determination result was sometimes the attention or warning state in the past. In this case, a state in which a warning degree is higher may be maintained in a predetermined determination period from the past to the present. When a clear button of a determination display field 174f is pressed, the determination result may be updated to the latest determination result. A graph relating to the measurement value is a visualized graph of the measurement value. For example, a bar graph showing the time width from the start timing to the end timing may be displayed. Lines corresponding to the attention value and the warning value may be displayed in positions corresponding to the attention value and the warning value. For example, when a threshold line display checkbox of a graph display field 174g is checked, threshold lines corresponding to the effective attention value and the effective warning value are displayed. When a setting button of the graph display field 174g is pressed, a setting dashboard among other dashboards corresponding to the application is displayed.

FIG. 18 shows an example of a setting dashboard 181 for the real-time monitoring application. When the setting button of the graph display field 174g in FIG. 17 is pressed, the setting dashboard 181 is displayed. In FIG. 18, operation state display 182 shows an operation state of real-time monitoring. A monitoring state changeover switch 183 is a switch for switching the real-time monitoring between a monitoring state and a non-monitoring state. A threshold collective setting button 184 is a button for shifting to a setting screen for collectively setting a plurality of thresholds provided for each of monitoring items. In input fields 185a to 185f, a monitoring checkbox, an item name, a start condition, an end condition, an attention value, and a warning value are displayed for each of monitoring items. An input field corresponding to the setting wizard for setting the application setting data of project data 15 in FIG. 2 may be provided. When an addition button 186a is pressed, an input row for inputting a new monitoring item is added. When a deletion button 186b is pressed, an input row selected by an up down button 186c in advance is deleted. When a setting reflection button 187 is pressed, updated setting content is reflected on the application setting data (display setting 62). Subsequently, the dashboard 171 for the real-time monitoring application based on the updated application setting data (the display setting 62) is displayed. When a cancel button 188 is pressed, the updated setting content is not reflected on the application setting data (the display setting 62). The dashboard 171 for the real-time monitoring application based on the application setting data (the display setting 62) is displayed.

Figure 19:
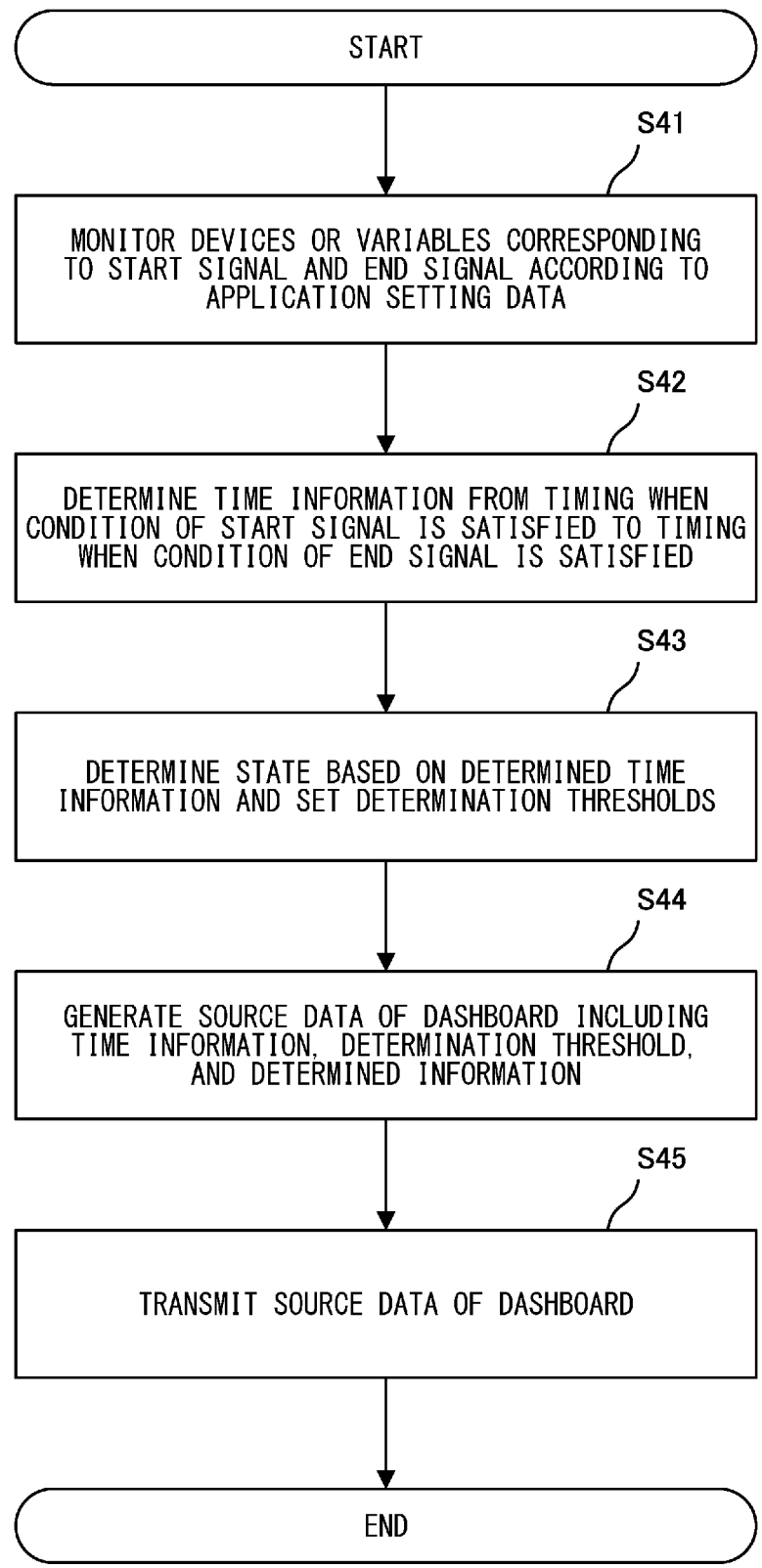
FIG. 19 is a flowchart showing a real-time monitoring method.

FIG. 19 is a flowchart showing execution of the data utilization program of the real-time monitoring processing executed by the CPU 41a of the extension unit 4a and provision of a dashboard.

In S41, the CPU 41a (the collecting section 82 of the flow executing section 81) monitors devices or variables corresponding to a start signal and an end signal according to the application setting data 154 of the setting data 73. The application setting data 154 holds a name of the device or the variable used as the start signal and a predetermined value stored in the device or the variable. Timing when a value of the device or the variable changes to the predetermined value is start timing. As shown in FIG. 18, a change of the device or the variable being a rising edge or a falling edge may be set as a start condition. The same applies to the end signal. The data utilization program based on the utilization program template 152a is executed, whereby a collection target device value designated by the application setting data 154 is collected. The collected data 75 is stored in the memory 42. The collected data 75 may be time-series data collected at different times. A collection program for executing a collecting operation according to the collection setting data 153 may be provided separately from the data utilization program. In this case, the collection setting data 153 is set according to the application setting data 154. A collection target device value designated by the set collection setting data 153 is collected. The collected data 75 is stored in the memory 42.

In S42, the CPU 41a (the data processing section 83) determines, based on the data 75 (the device value) collected according to the data utilization program designated by the setting data 73, time information from timing when a condition of the start signal is satisfied to timing when a condition of the end signal is satisfied. The CPU 41a (the data processing section 83) monitors, according to a start condition 162c in FIG. 16 and a start condition 185c in FIG. 18, whether the device or the variable set as the monitoring target satisfies a detection condition such as a rising edge. Timing when the detection condition is satisfied, that is, timing when the condition of the start signal is satisfied is monitored. Similarly, the CPU 41a (the data processing section 83) monitors, according to an end condition 162d in FIG. 16 and an end condition 185d in FIG. 18, whether the device or the variable set as the monitoring target satisfies a detection condition such as a rising edge. Timing when the detection condition is satisfied, that is, timing when the condition of the end signal is satisfied is monitored. The time information determined by the CPU 41a (the data processing section 83) may be a time width from the timing when the condition of the start signal is satisfied to the timing when the condition of the end signal is satisfied.

In S43, the CPU 41*a* (the data processing section 83) determines a state based on the time information determined in S42 and determination thresholds set according to the application setting data 154. The upper limit values and the lower limit values of the attention value and the warning value are sometimes set as the determination thresholds. In this case, the CPU 41*a* (the data processing section 83) determines whether the determined time information, which is the measurement value, is larger than the upper limit value. The CPU 41*a* (the data processing section 83) determines whether the determined time information is smaller than the lower limit value. The application setting data 154 may include flags indicating whether the upper limit values and the lower limit values are used as the determination thresholds. In this case, the CPU 41*a* (the data processing section 83) compares, based on the flags included in the application setting data 154, the determined time information, which is the measurement value, and the upper limit values and the lower limit values to determine a state of the monitoring target. Values of the flags can be set by the user through a UI (user interface) such as a checkbox. The state of the monitoring target may include normal, attention, and warning. The attention state and the warning state are distinguished based on a deviation degree of the measurement value with respect to the normal state. A difference between a measurement value (a normal value) in the normal state and a measurement value (a warning value) in the warning state is larger than a difference between a measurement value in the normal state and a measurement value (an attention value) in the attention state. Accordingly, a value further deviating from the normal value than the attention value is set as the warning value. The attention value and the waring value are sometimes respectively set as upper limit values. In this case, the CPU 41*a* (the data processing section 83) determines the state of the monitoring target as "normal" when the determined time information is equal to or smaller than the attention value. The CPU 41*a* (the data processing section 83) determines the state of the monitoring target as "attention" when the determined time information is larger than the attention value and is equal to or smaller than the warning value. The CPU 41*a* (the data processing section 83) determines the state of the monitoring target as "warning" when the determined time information is larger than the warning value. Consequently, the analyzed data 76 is created and saved in the memory 42*a*.

The attention value and the warning value are sometimes respectively set as the lower limit values. In this case, the CPU 41*a* (the data processing section 83) determines the state of the monitoring target as "normal" when the determined time information is equal to or larger than the attention value. The CPU 41*a* (the data processing section 83) determines the state of the monitoring target as "attention" when the determined time information is smaller than the attention value and is equal to or larger than the warning value. The CPU 41*a* (the data processing section 83) determines the state of the monitoring target as "warning" when the determined time information is smaller than the warning value. Consequently, analyzed data is created and saved in the memory.

The attention value and the warning value are sometimes respectively set by upper limit values and lower limit values. In this case, the CPU 41*a* (the data processing section 83) determines the state of the monitoring target as "normal" when the determined time information is equal to or larger than the lower limit attention value and equal to or smaller than the upper limit attention value. The CPU 41*a* (the data processing section 83) determines the state of the monitoring target as "attention" when the determined time information is smaller than the upper limit warning value and equal to or larger than the upper limit attention value. Similarly, the CPU 41*a* (the data processing section 83) determines the state of the monitoring target as "attention" when the determined time information is smaller than the lower limit attention value and equal to or larger than the lower limit warning value. The CPU 41*a* (the data processing section 83) determines the state of the monitoring target as "warning" when the determined time information is smaller than the lower limit warning value or larger than the upper limit warning value. Consequently, analyzed data is created and saved in the memory.

The CPU 41*a* (the data processing section 83) may calculate a margin degree indicating to which degree the measurement value has a margin with respect to the warning value or the attention value. For example, the margin degree may be defined as being 100 in a state with a sufficient margin, 50 in the attention state, and 0 in the warning state. In this way, the margin degree may be defined such that a value changes stepwise according to the distance (the difference) between the attention value and the measurement value. The margin degree is saved in the memory 42*a* as the analyzed data 76. When the measurement value exceeds the warning value, the CPU 41*a* (the data processing section 83) may generate a signal indicating that the measurement value exceeds the warning value. For example, when the measurement value exceeds the warning value, the CPU 41*a* (the data processing section 83) changes a value of a device or a variable indicating that the measurement value exceeds the warning value. The device or the variable indicating that the measurement value exceeds the warning value may be allocated as a trigger. For example, the device or the variable may be allocated to a logging saving trigger. Consequently, an operation record or the like of the PLC 1 is saved based on timing when warning is generated.

In S44, the CPU 41*a* (the display processing section 84) generates source data of the dashboard 171 including the time information determined in S42, the determination thresholds, and the state of the monitoring target determined in S43. The CPU 41*a* (the display processing section 84) reflects the time information determined based on the dashboard template 151*a* of the setting data 73, the determination thresholds, and the determined state of the monitoring target on the variable allocated to the dashboard template 151*a*. For example, the CPU 41*a* (the display processing section 84) creates display data such that a measurement value indicating a time width from timing when the condition of the start signal is satisfied to timing when the condition of the end signal is satisfied is displayed in a form of a bar graph in the graph display field 174*g* in FIG. 17. At this time, a time period from the timing when the condition of the start signal is satisfied to the timing when the condition of the end signal is satisfied may be displayed in a belt shape. Consequently, a dashboard indicating not only the time width but also in which timing in a cycle the monitoring targets are operating in the control of the cycle operation is displayed. For example, a right end to a left end of the graph display field 174*g* may be equivalent to one cycle of the monitoring target. A start position of a belt (a bar of the bar graph) is equivalent to timing when the condition of the start signal in one cycle is satisfied. The end position of the belt is equivalent to timing when the condition of the end signal in one cycle is satisfied. Accordingly, the length of the belt indicates the time width.

The margin degree may be displayed together with the measurement value. The CPU 41*a* (the display processing section 84) creates, based on a variable allocated to the dashboard template 151*a*, display data (for example, HTML data) for displaying the dashboard 171. The CPU 41*a* (the display processing section 84) may separately manage screen data, on which the dashboard 171 is based, and data to be updated such as the measurement value and the state information. In this case, the CPU 41*a* (the display processing section 84) individually manages screen data to which a device or a variable at a reference destination is allocated and display target data, which is a value of the device or the variable at the reference destination. The CPU 41*a* may periodically update the display target data to create the display data. The display processing section 84 creates the display data using the display target data such as the collected data 75 and/or the analyzed data 76.

In S45, the CPU 41*a* (the Web server 85) provides the display data to the PC 2*b*. The CPU 41*a* may display the display data on a display of the PLC 1. The display of the PLC 1 may be incorporated in the PLC 1 or may be connected to the PLC 1 by wire or radio. The CPU 41*a* (the display processing section 84) sometimes separately manages the screen data to which the device or the variable at the reference destination is allocated and the display target data, which is the value of the device or the variable at the reference destination. In this case, the CPU 41*a* (the Web server 85) selectively provides the screen data and the display target data in the display data according to an update request and an update schedule for the dashboard 171. The CPU 41*a* (the Web server 85) provides the display data including the screen data and the display target data according to a display request for the dashboard 171. The CPU 41*a* (the Web server 85) selectively provides updated display target data as the display data according to the display update request for the dashboard 171.

Figure 20:
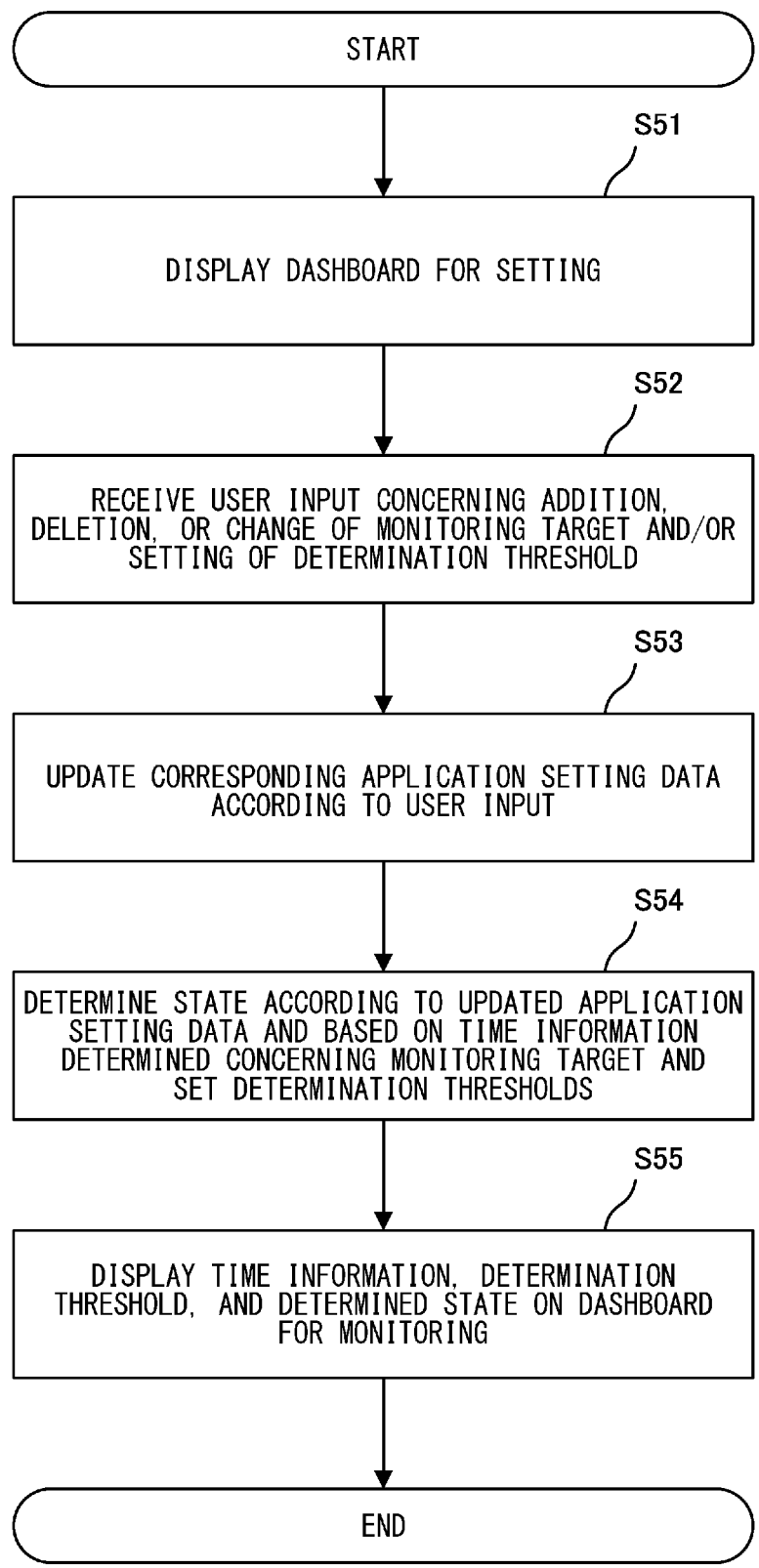
FIG. 20 is a flowchart showing a resetting method in the data utilization unit.

FIG. 20 shows a flowchart showing setting processing via a dashboard of the real-time monitoring executed by the CPU 11 of the PC 2*a*.

In S51, the CPU 41*a* (the display processing section 84) displays the dashboard 181 for setting. For example, the display processing section 84 creates display data in order to display the dashboard 181 for setting shown in FIG. 18. The CPU 41*a* (the Web server 85) provides display data for displaying the dashboard 181 for setting to the PC 2*b*.

In S52, the CUP 41*a* (the setting section 80) receives a user input for addition, deletion, and change of the monitoring target and/or setting of the determination thresholds. When detecting that the addition button 186*a* is pressed, the CPU 41*a* (the setting section 80) adds an input row for setting a new monitoring target. The CPU 41*a* (the display processing section 84) creates display data in order to display the dashboard 181 for setting to which the input row for setting the new monitoring target is added. The CPU 41*a* (the Web server 85) provides display data for displaying the updated dashboard 181 for setting to the PC 2*b*. The setting section 80 may be provided in the flow executing section 81 and receive setting as a part of the data utilization program execution. When detecting that the deletion button 186*b* is pressed, the CPU 41*a* (the setting section 80) deletes a selected input row. The CPU 41*a* (the display processing section 84) creates display data for displaying the dashboard 181 for setting in which the selected input row is deleted. The CPU 41*a* (the Web server 85) provides display data for displaying the updated dashboard 181 for setting to the PC 2*b*. In this case, selection operation on the input row by the up down button 186*c* may be displayed. When the CPU 41*a* (the setting section 80) receives a change input to the input fields 185*a* to 185*d*, the CPU 41*a* (the display processing section 84) creates display data in order to display the dashboard 181 for setting on which the change input to the input fields 185*a* to 185*d* is reflected. The CPU 41*a* (the Web server 85) provides display data for displaying the updated dashboard 181 for setting to the PC 2*b*. When the CPU 41*a* (the setting section 80) receives a change input for the determination thresholds to the input fields 185*e* and 185*f*, the CPU 41*a* (the display processing section 84) creates display data in order to display the dashboard 181 for setting on which the change input for the determination thresholds to the input fields 185*e* and 185*f* are reflected. The CPU 41*a* (the Web server 85) provides the display data for displaying the updated dashboard 181 for setting to the PC 2*b*.

In S53, the CPU 41*a* (the setting section 80) updates, according to a user input, the application setting data 154 corresponding to the user input. When detecting that the setting reflection button 187 is pressed, the CPU 41*a* (the setting section 80) reflects updated setting content on the application setting data 154. On the other hand, when detecting that the cancel button 188 is pressed, the CPU 41*a* (the setting section 80) does not reflect the updated setting content on the application setting data 154 and discards the updated setting content. The CPU 41*a* (the display processing section 84) creates display data in order to display the dashboard 171 for the real-time monitoring application based on the application setting data 154 without reflecting the updated setting content. The CPU 41*a* (the Web server 85) provides display data for displaying the dashboard 171 for the real-time monitoring application to the PC 2*b*.

In S54, the CPU 41*a* (the data processing section 83) determines a state of the monitoring target according to the application setting data 154 updated in S53 and based on the determined time information and the set determination thresholds concerning the monitoring target. The CPU 41*a* (the data processing section 83) determines the state of the monitoring target as in S53 according to the updated application setting data 154 and based on time information determined as in S42 and a determination threshold set according to the updated application setting data 154.

In S55, the CPU 41*a* (the display processing section 84) creates display data for displaying, on the dashboard for state monitoring shown in FIG. 18, the time information determined according to the updated application setting data 154, the determination threshold set according to the updated application setting data 154, and the state of the monitoring target determined in S54. The CPU 41*a* (the Web server 85) provides display data for displaying the dashboard 171 for state monitoring to the PC 2*b*.

Figure 21:
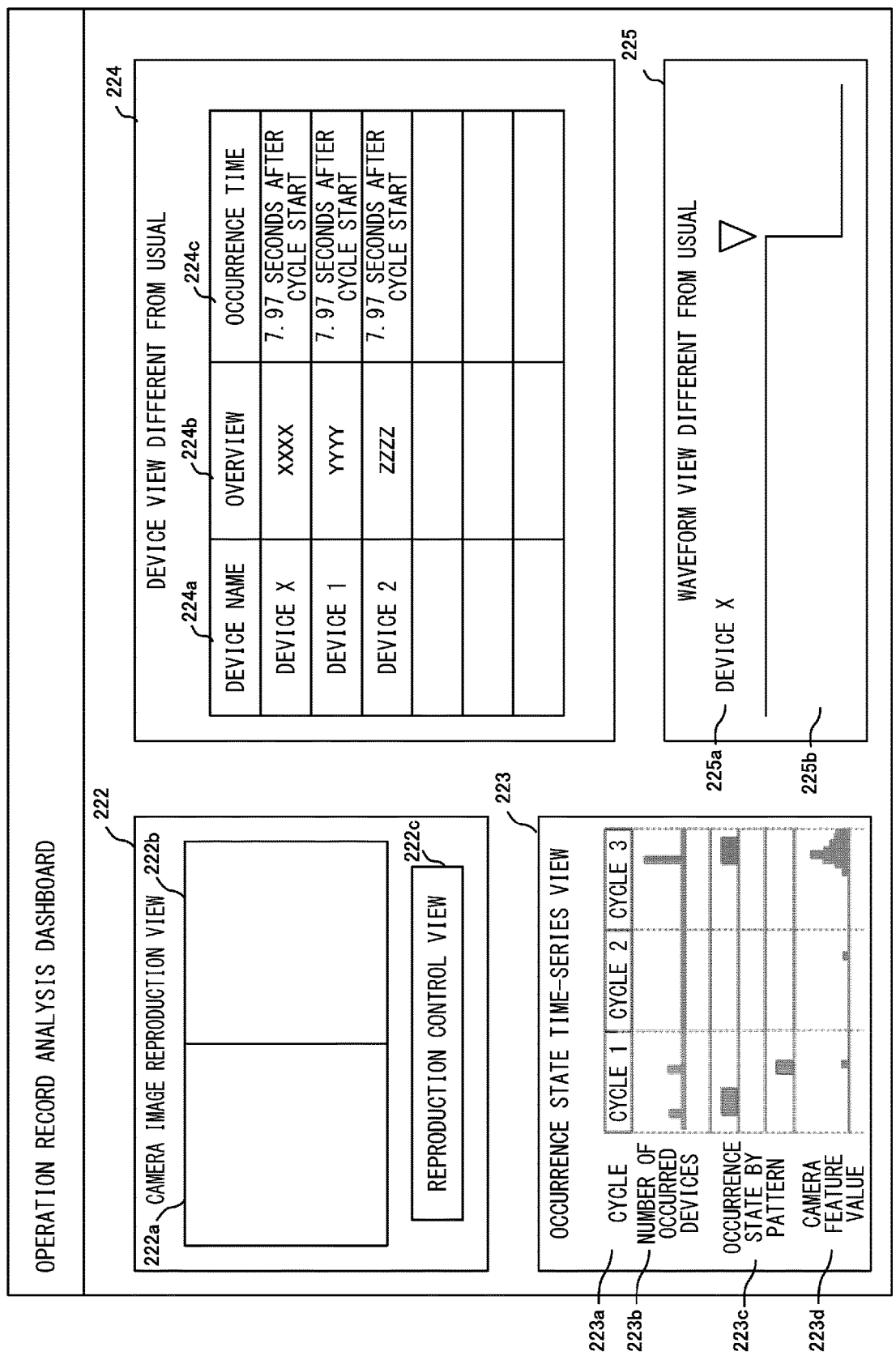
FIG. 21 is a diagram for explaining a dashboard display screen for an operation record analysis.

FIG. 21 shows an example of a dashboard 221 for the operation record analysis application. The dashboard 221 for the operation record analysis application includes a camera image reproduction view 222, an occurrence state time-series view 223, a device view different from usual 224, and a waveform view different from usual 225. The operation record analysis application analyzes an operation record of the PLC 1 saved in advance by the CPU 41*a* (the data processing section 83) and presents, with the CPU 41*a* (the display processing section 84), a device or a variable of operation different from usual. The CPU 41*a* (the data processing section 83) analyzes an operation record at normal time to thereby set a detection algorithm and a detection threshold for each of monitoring targets. The CPU 41*a* (the data processing section 83) applies the detection algorithm and the detection threshold set for each of the monitoring targets to an analysis target operation record and determines a device or a variable of operation different from usual. The operation record analysis application may rank and display, for example, according to a deviation degree from the normal time, the device or the variable of the operation different from usual. For example, a device or a variable holding a value deviating most from a value at the normal time may be displayed at the top or may be highlighted.

The operation record of the PLC 1 is an operation record in which collection target devices or variables collected according to the collection setting data 153 for defining collection targets and saving conditions are saved in the basic unit 3 or the extension units 4a and 4b in the PLC 1 according to the saving conditions. For example, it is assumed that the CPU 31 collects the collection target devices or variables according to the collection setting data 153. When satisfaction of the saving conditions is detected, the CPU 31 saves devices or variables collected based on timing when the saving conditions are satisfied in the storage device 32 as the operation record of the PLC 1. The operation record is saved every time the saving conditions are satisfied. For example, the operation record may be saved in the storage device 32 as a file together with time when the saving conditions are satisfied. The collection targets of the operation record of the PLC 1 may be collectively set in a program unit of the control program 155 or the like or a unit of the basic unit 3, the extension units 4a and 4b, or the like. Consequently, devices or variables relating to the operation of the PLC 1 are collectively recorded. Accordingly, the user can record the devices or variables relating to the operation of the PLC 1 without specifying an individual monitoring target in advance. It is possible to reproduce an operation state of the PLC 1 based on the timing when the saving conditions are satisfied and analyze an operation state of the PLC 1 based on the timing when the saving conditions are satisfied. The saving conditions may be selected from a saving command for the control program 155, a saving trigger by an allocated device or variable, a time trigger that occurs at predetermined time, and the like. The saving conditions are set according to a user input.

In FIG. 21, the camera image reproduction view 222 includes an abnormal-time-image-reproduction display section 222a, a normal-time-image-reproduction display section 222b, and a reproduction control view 222c. In the abnormal-time-image-reproduction display section 222a, a camera image acquired at timing when a device or a variable of an operation different from usual of the operation record analysis application is detected is displayed among camera images included in an analysis target operation record. In the normal-time-image-reproduction display section 222b, a camera image synchronized in time with the camera image displayed in the abnormal-time-image-reproduction display section 222a is displayed among camera images included in an operation record corresponding to the normal time. The PLC 1 sometimes executes cycle control, which is control having periodicity. In this case, time-series data of at least a part of devices or variables included in an operation record corresponding to the cycle control has periodicity conforming to the cycle control. The CPU 41a (the data processing section 83) analyzes, from the time-series data of the device or the variable included in the operation record, the periodicity of the time-series data and determines a device or a variable that specifies a period of the cycle control. The CPU 41a (the setting section 80) may select a reference device, which is a device or a variable that specifies the period of the cycle control, according to a user input. The camera image displayed in the abnormal-time-image-reproduction display section 222a and the camera image displayed in the normal-time-image reproduction display section 222b are reproduced in synchronization based on the periodicity of the cycle control and time information linked with the camera images. For example, display of two camera images may be updated in every fixed cycle. In this case, the two camera images would be displayed as if the camera images are a moving image.

The reproduction control view 222c includes operation buttons for operating, in synchronization, the display of the two camera images displayed in the camera image reproduction view 222. The operation buttons include a stop button, a forward button, and a return button. When the "stop button" is pressed, the camera image displayed in the abnormal-time-image-reproduction display section 222a and the camera image displayed in the normal-time-image-reproduction display section 222b are temporarily stopped in synchronization. When the "forward button" or the "return button" is pressed, display time of the camera image displayed in the abnormal-time-image-reproduction display section 222a and display time of the camera image displayed in the normal-time-image-reproduction display section 222b are changed in synchronization.

The occurrence state time-series view 223 is a screen that displays an analysis result of the operation record. The analysis result includes, for example, a device or a variable of operation different from usual detected by applying a detection algorithm and a detection threshold set for each of the monitoring targets to a plurality of devices saved as the operation record.

Cycles of the cycle control are displayed in time series in a cycle display field 223a. Divisions of the cycles may be specified by a reference device. The CPU 41a (the data processing section 83) detects that a change of a state or a value of the reference device included in the operation record satisfies a condition (which may be called cycle condition or division condition). Timing when the division condition is satisfied is equivalent to the divisions of the cycles. The CPU 41a determines periods of the cycles according to the determined divisions of the cycles and displays the cycles in the cycle display field 223a. In this example, three cycles, that is, a cycle 1, a cycle 2, and a cycle 3 are displayed. In an occurred device display field 223b, the number of occurrences of devices different from usual is displayed in time series according to the cycles. The CPU 41a (the data processing section 83) applies the detection algorithm and the detection threshold set for each of the monitoring targets to the analysis target operation record and aggregates, in time series, the number (the number of occurrences) of devices or variables exceeding the detection threshold. In this example, occurrence of devices different from usual in the cycle 1 and the cycle 3 is shown.

In an occurrence state by pattern display field 223c, occurrence states of devices different from usual by pattern are displayed. The CPU 41a (the data processing section 83) applies the detection algorithm and the detection threshold set for each of the monitoring targets to the analysis target operation record and aggregates, for each of patterns of states different from usual, occurrence periods of devices or variables exceeding the detection threshold. In this example, the occurrence state by pattern display field 223c includes an upper column, an intermediate column, and a lower column. In the upper column, an ON/OFF pattern is adopted as a pattern in a state different from usual. That is, an occurrence state of the ON/OFF pattern different from a usual ON/OFF pattern is displayed in the upper column. An occurrence state of a value of a constant different from the normal time is displayed in the intermediate column. An occurrence state of ON/OFF timing different from usual ON/OFF timing is displayed in the lower column. In a camera feature value display field 223*d*, the number of times feature values of a camera different from a usual feature value of the camera occur is displayed. An operation record saved when a saving trigger of logging occurs may include image data of the camera. The CPU 41*a* (the data processing section 83) may generate feature value data concerning a light reception amount and luminance included in a camera image and analyze the feature value data according to periodicity to display the number of times feature values different from usual occur.

In the device view different from usual 224, details about occurrence states of devices different from usual for each cycle and for each scan are displayed. In display fields 224*a* to 224*c*, a device name of a device in which a state different from usual occurs, an overview of the occurrence of the state different from usual, and occurrence time are respectively displayed. A target period of information displayed in the device view different from usual 224 may be selected according to a user input. For example, when receiving the user input in the occurrence state time-series view 223, the CPU 41*a* (the setting section 80) selects a cycle corresponding to the user input. The CPU 41*a* (the data processing section 83) analyzes the cycle selected from the analysis target operation record to extract devices in which states different from usual occur in the cycle. The CPU 41*a* (the display processing section 84) displays a list of extracted devices in the device view different from usual 224. In the device view different from usual 224, it is possible to confirm, in a list-like manner, what kind of a change occurs in which device and when the change occurs.

In the waveform view different from usual 225, a waveform of time-series data is displayed about a specific device among the devices in the states different from usual. A device displayed in the waveform view different from usual 225 may be selected according to a user input. For example, when receiving a user input in the device view different from usual 224, the CPU 41*a* (the setting section 80) selects a device corresponding to the user input. The CPU 41*a* (the data processing section 83) extracts a device selected from the analysis target operation record. The CPU 41*a* (the display processing section 84) displays, in the device view different from usual 224, a waveform of time-series data about the extracted device. Consequently, the user can confirm when and how the device displayed in the device view different from usual 224 changes. Time-series data of a predetermined device among a plurality of devices included in an operation record acquired at the normal time may also be simultaneously displayed in the device view different from usual 224. The predetermined device corresponds to a device in a state different from usual. In this way, about a certain device, time series data at the normal time and time-series data at irregular time (occurrence time of a state different from usual) may be comparably displayed.

Figure 22:
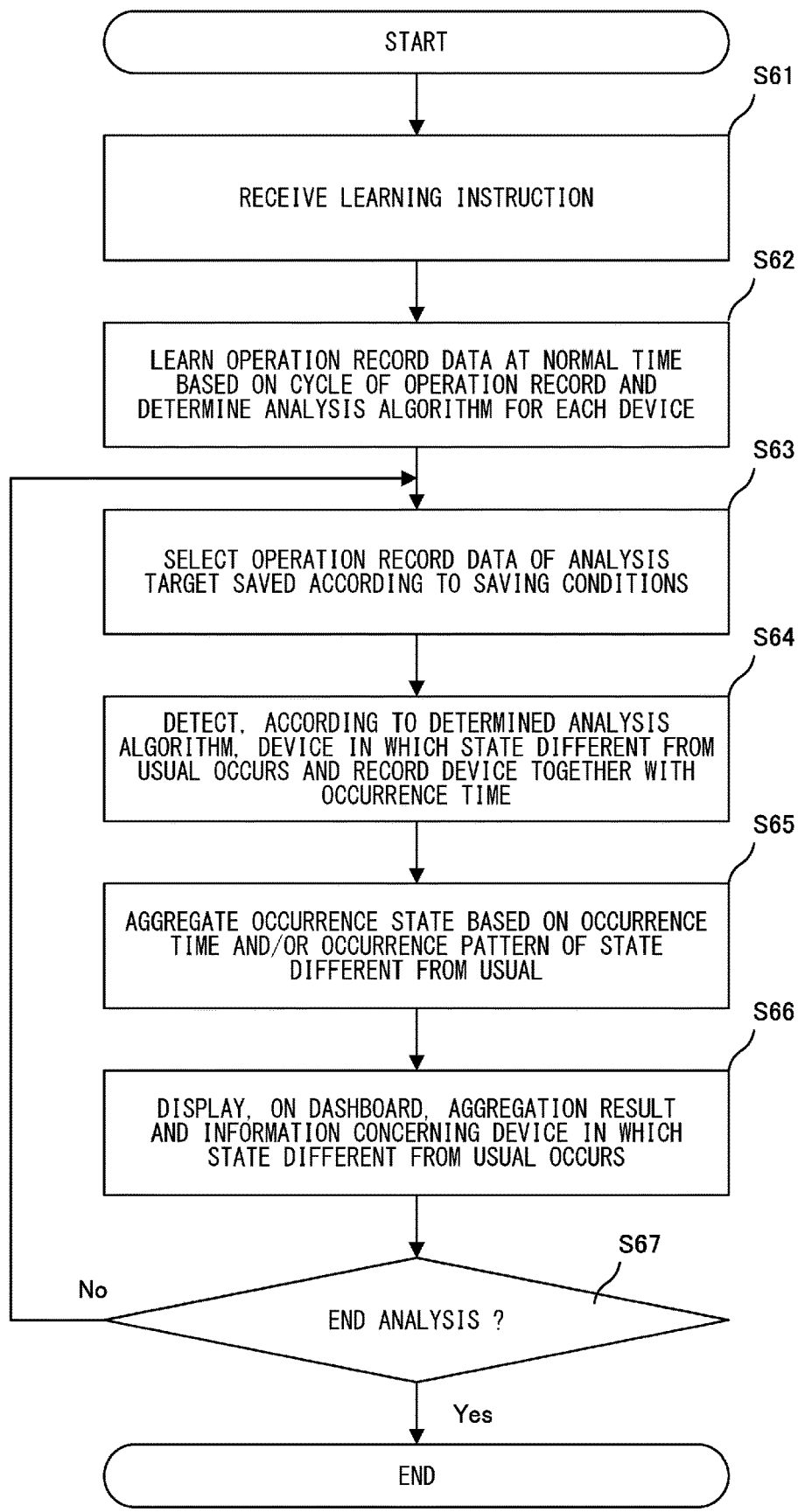
FIG. 22 is a flowchart showing an operation record analyzing method.

FIG. 22 shows a flowchart showing setting processing via a dashboard of an operation record analysis executed by the CPU 41*a* of the data utilization unit 4*a*.

In S61, the CPU 41*a* (the setting section 80) receives a learning instruction from the user. When receiving an instruction for a learning start according to a user input, the CPU 41*a* (the setting section 80) starts saving of an operation record. For example, the CPU 41*a* (the setting section 80) changes a value of a variable allocated to the saving conditions of the operation record to a value for satisfying the saving conditions. The CPU 41*a* (the setting section 80) automatically selects, as an operation record at the normal time for learning, an operation record saved according to the instruction for the learning start. The CPU 41*a* (the setting section 80) may select operation record data at the normal time saved in advance according to a user input. In this case, in order to set a detection algorithm and a detection threshold of a device different from usual, the CPU 41*a* (the display processing section 84) creates display data of a screen for selecting operation record data at the normal time. The CPU 41*a* (the Web server 85) provides display data for displaying the selection screen to the PC 2*b*. The CPU 41*a* (the setting section 80) receives user selection of the operation record data at the normal time.

In S62, the CPU 41*a* (the flow executing section 81) learns the operation record data at the normal time based on the cycle recorded in the operation record and determines an analysis algorithm for each of devices. For example, the CUP 41*a* (the flow executing section 81) determines an analysis algorithm for each of the devices based on the operation record data at the normal time selected in S61 and the cycle recorded in the operation record. The CPU 41*a* (the flow executing section 81) may specify, from the operation record data at the normal time, a steady change pattern of a device signal relating to the cycle of the cycle operation. The CPU 41*a* (the flow executing section 81) may determine an analysis algorithm for each of change patterns of the specified device signal.

In S63, the CPU 41*a* (the setting section 80) selects operation record data of an analysis target saved according to the saving conditions. When the saving conditions for saving analysis target operation record data are satisfied and the operation record data is saved, the CPU 41*a* (the setting section 80) automatically selects the saved operation record data as the analysis target operation record data. The CPU 41*a* (the setting section 80) may select the analysis target operation record data according to a user input. In this case, the CPU 41*a* (the display processing section 84) creates display data of a screen for selecting analysis target operation record data, which is a target for analyzing a state different from usual. The CPU 41*a* (the Web server 85) provided the display data for displaying the selection screen to the PC 2*b*. The CPU 41*a* (the setting section 80) receives user selection of the analysis target operation record data.

In S64, the CPU 41*a* (the data processing section 83) detects, according to the determined analysis algorithm, a device in which a state different from usual occurs and records the device together with occurrence time. For example, the CPU 41*a* (the data processing section 83) analyzes, according to the analysis algorithm determined in S62, the operation record data selected in S63. The CPU 41*a* (the data processing section 83) analyzes the operation record data to detect the device in which the state different from usual occurs and records the device together with time when the state different from usual occurs in the memory 42*a*.

In S65, the CPU 41*a* (the data processing section 83) aggregates an occurrence state based on the occurrence time and/or the occurrence pattern of the stat different from usual. The CPU 41*a* (the data processing section 83) aggregates the occurrence state of the state different from usual based on at least one of the time when the state different from usual occurs and the occurrence pattern of the state different from usual.

In S66, the CPU 41*a* (the display processing section 84) displays, on the dashboard, an aggregation result and information concerning the device in which the state different from usual occurs. The CPU 41*a* (the display processing section 84) creates display data for displaying, on the operation record analysis dashboard 221, the aggregation result and the information concerning the device in which the state different from usual occurs. The CPU 41a (the Web server 85) provides, to the PC 2b, display data for displaying the updated operation record analysis dashboard 221. In S67, when determining that the end condition for the operation record analysis is satisfied, the CPU 41a ends the operation record analysis. The CPU 41a repeatedly executes the processing in S63 to S66 until the end condition for the operation record analysis is satisfied.

Figure 23:
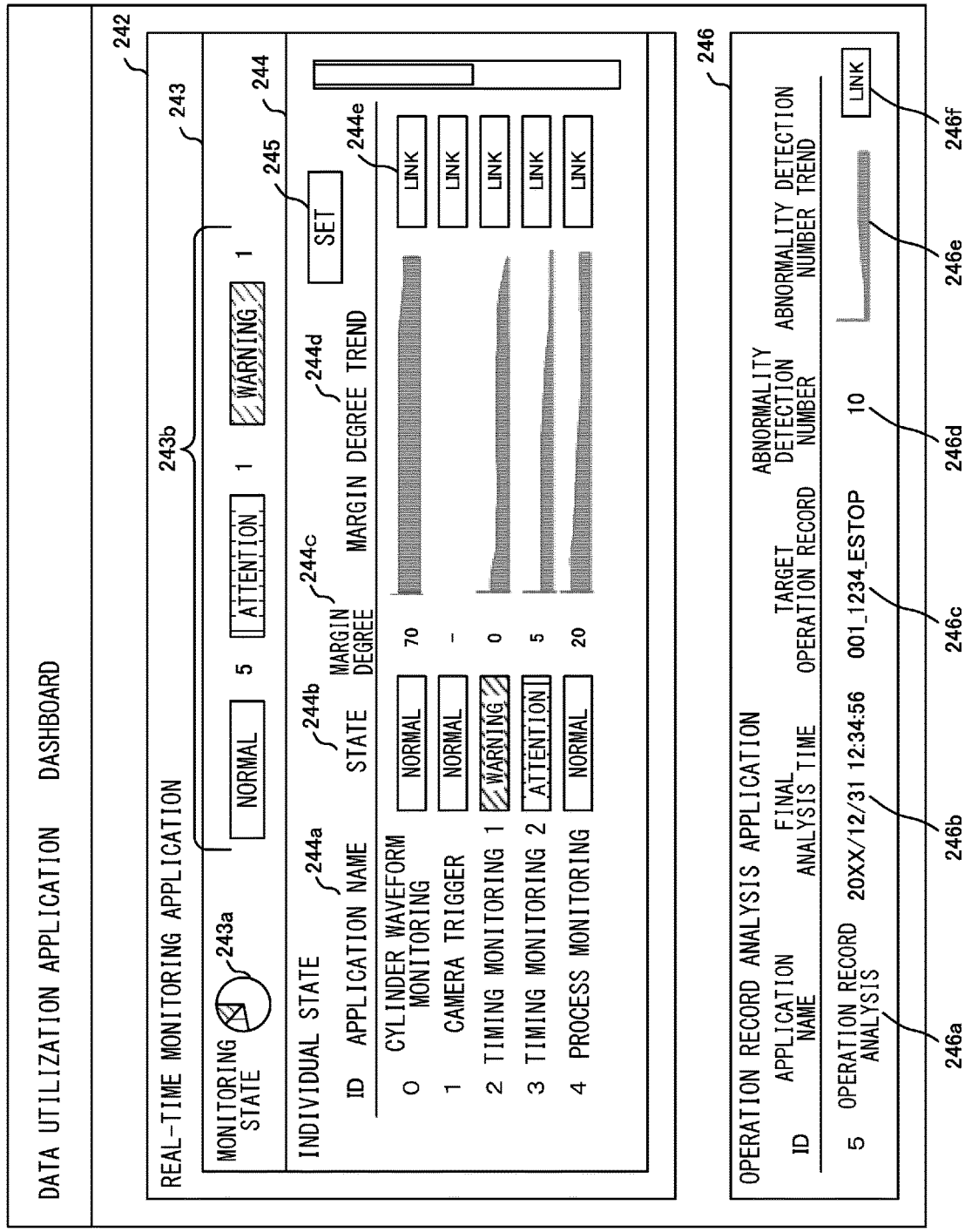
FIG. 23 is a diagram for explaining a dashboard display screen for integrated monitoring.

FIG. 23 shows an example of a dashboard 241 for the data utilization application. The dashboard 241 for the data utilization application includes a display section for real-time monitoring application 242 and a display section for operation record analysis application 246. The dashboard 241 for the data utilization application is a dashboard for integrating and monitoring a set real-time monitoring application and a set operation record analysis application. The dashboard 241 may display overviews of the applications and function as a portal to dashboards corresponding to the applications. When the applications are set, the set applications are automatically added as display targets to the dashboard 241 for the data utilization application.

The display section for real-time monitoring application 242 includes a monitoring state screen 243 and an individual state screen 244. A graph 243a and an aggregation icon 243b are displayed on the monitoring state screen 243. The graph 243a indicates in which ratios applications of a normal state, an attention state, and an abnormal state (a warning state) are present in a monitoring application. In FIG. 23, the graph 243a is a pie graph. However, the graph 243a may be a graph of any format if the graph can display a ratio. The aggregation icon 243b represents the number of the applications of the normal state, the attention state, and the abnormal state in the monitoring application.

An application name 244a, a state 244b, a margin degree 244c, a margin degree trend 244d, a link button 244e, and a setting button 245 are displayed on the individual state screen 244. The application name 244a represents a name of an application displayed on the individual state screen 244. The state 244b represents a monitoring state corresponding to the application name 244a. The monitoring state may be three kinds of normal, attention, and abnormal (warning) as shown in FIG. 23. In this case, hatchings different from one another may be given to the three kinds of states. Alternatively, colors different from one another may be given to the three kinds of state: green may be given to normal, yellow may be given to attention, and red may be given to abnormal. Such highlighted display may be adopted.

The margin degree 244c indicates a comprehensive margin degree for each of applications calculated based on a margin degree of a monitoring target device or variable corresponding to the application name 244a. The margin degree for each of the applications may be defined to be, for example, 100 in a state with a sufficient margin, 50 at an attention value, and 0 at a warning value. For example, margin degrees of a respective plurality of monitoring targets may be averaged to calculate the comprehensive margin degree. The margin degree 244c may be displayed in different display formats as the margin degree 244c is further away from a value indicating the state with the sufficient margin. For example, a margin degree larger than 50 is displayed in black, a margin degree larger than 10 and equal to or smaller than 50 is displayed in yellow, and a margin degree equal to or smaller than 10 is displayed in red.

The margin degree trend 244d represents a change with time of a margin degree corresponding to the application name 244a. In this example, the right end of the margin degree trend 244d represents a present margin degree. The margin degree trend 244d indicates a margin degree more in the past toward the left side. By confirming the margin degree trend 244d, the user can confirm whether the margin degree decreases from which timing. The link button 244e is a link to the dashboard 171 for an individual real-time monitoring application corresponding to the application name 244a. When the link button 244e is pressed, the CPU 41a displays a detailed monitoring state of an individual application on the PC 2b. The setting button 245 is a button for displaying a screen for performing setting of the display section for real-time monitoring application 242. When the setting button 245 is pressed, the CPU 41a performs, according to a user input, switching of a display format of the graph 243a and display/non-display of a column displayed on the individual state screen 244 and setting about whether the margin degree 244c is sorted according to the magnitude of the margin degree.

The operation-record-analysis-application display section 246 includes an application name 246a, a last analysis time 246b, a target operation record 246c, an abnormality detection number 246d, an abnormality detection number trend 246e, and a link button 246f. The application name 246a displays a name of an application displayed on the operation-record-analysis-application display section 246. The last analysis time 246b displays time when an operation record analysis is performed last. The operation record analysis may include an analysis of an operation record saved at every predetermined time and an analysis of an operation record saved when a logging saving trigger occurs. By confirming the last analysis time 246b, the user can confirm an operation record to which point in time has been analyzed. The target operation record 246c represents data set as a target in an analysis executed at the time displayed in the last analysis time 246b.

The abnormality detection number 246d represents the number of devices or variables in which abnormalities are detected in the analysis executed at the time displayed in the last analysis time 246b. The abnormality detection number trend 246e represents a change with time of the number of abnormalities detected in the operation record analysis. In this example, the right end of the abnormality detection number trend 246e represents a present abnormality detection number. In the abnormality detection number trend 246e, an abnormality detection number more in the past is shown from the right side toward the left side. By confirming the abnormality detection number trend 246e, the user can confirm from which timing the abnormality detection number increases. The link button 246f is a link to the dashboard 221 for an operation record analysis application corresponding to the application name 246a. When the link button 246f is pressed, the CPU 41a may display, on the PC 2b, a detailed result of an operation record analysis corresponding to the last analysis time 246b.

Figure 24:
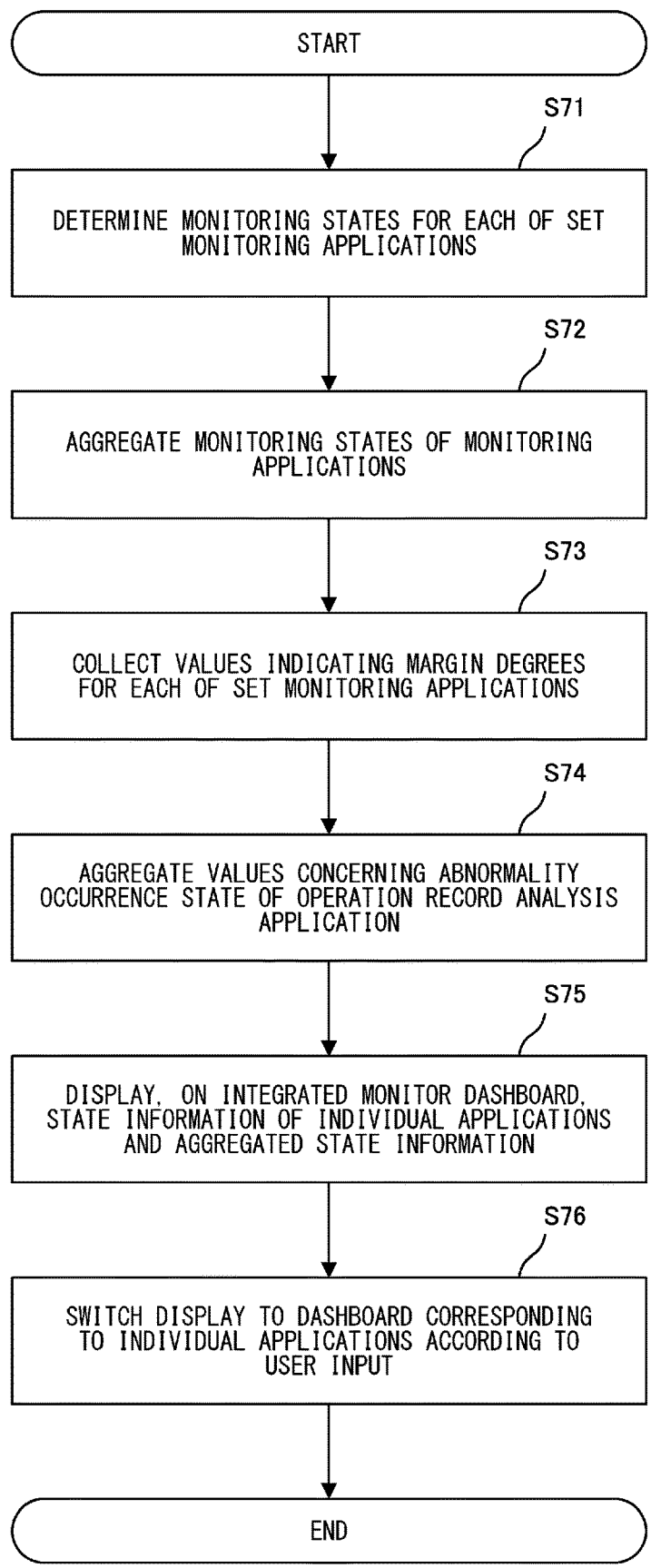
FIG. 24 is a flowchart showing an integrated monitoring method.

FIG. 24 is a flowchart showing integrated monitor processing for generating the dashboard 241 for the data utilization application. In S71, the CPU 41a (the data processing section 83) determines a monitoring state for each of set monitoring applications. For example, the CPU 41a (the data processing section 83) determines, for each of the set monitoring applications, monitoring states representing the applications. The representative monitoring states are determined from monitoring states of each of monitoring targets determined according to a detection algorithm decided for each of monitoring target devices or variables. For example, a worst monitoring state among the monitoring states of each of the monitoring targets may be determined as a monitoring state representing the applications.

In S72, the CPU 41a (the data processing section 83) aggregates the monitoring states of the monitoring applications. The CPU 41a (the data processing section 83) aggregates, for each of states, the monitoring states representing the respective monitoring applications. The aggregating the monitoring states for each of the states includes individually aggregating the number of the normal states, the number of the attention states, and the number of the abnormal states. In S73, the CPU 41a (the data processing section 83) collects a value indicating a margin degree for each of the set monitoring applications. For example, the CPU 41a (the data processing section 83) collects, about the monitoring applications having margin degrees, values of margin degrees representing the applications. A lowest margin degree among the monitoring states for each of the monitoring targets is determined as a margin degree representing the applications. In S74, the CPU 41a (the data processing section 83) aggregates values concerning abnormality occurrence states of the operation record analysis application. For example, the CPU 41a (the data processing section 83) collects the number of devices or variables in states different from usual.

In S75, the CPU 41a (the display processing section 84) displays, on the integrated monitor dashboard (the dashboard 241 for the data utilization application), state information of each of the individual applications and aggregated state information. For example, the CPU 41a (the display processing section 84) creates display data of the dashboard 241 for the data utilization application. The CPU 41a (the Web server 85) provides display data for displaying a selection screen to the PC 2b. The CPU 41a (the display processing section 84) sometimes separately manages screen data to which a device or a variable at a reference destination is allocated and display target data, which is a value of the device or the variable at the reference destination. In this case, the CPU 41a (the Web server 85) selectively provides the screen data and the display target data in the display data according to an update request and an update schedule of the dashboard 241. The CPU 41a (the Web server 85) provides the display data including the screen data and the display target data according to a display request of the dashboard 241. The CPU 41a (the Web server 85) selectively provides updated display target data as the display data according to a display update request of the dashboard 241.

In S76, the CPU 41a (the setting section 80) switches display to a dashboard corresponding to the individual applications according to a user input. For example, the CPU 41a (the setting section 80) receives a user input for switching the dashboard. When detecting that the switching button is pressed, the CPU 41a (the setting section 80) creates display data for displaying a selection screen for the dashboard 171 for the real-time monitoring application and the dashboard 221 for the operation record analysis application. Further, the CPU 41a (the Web server 85) provides display data for displaying the selection screen to the PC 2b. The CPU 41a (the setting section 80) may detect that it is selected on the selection screen which of the dashboard 171 for the real-time monitoring application and the dashboard 221 for the operation record analysis application is displayed. The CPU 41a (the display processing section 84) creates display data for displaying the selected dashboard. The CPU 41a (the Web server 85) provides display data for displaying the selected dashboard to the PC 2b.

As the data utilization program, the examples of the flow program created according to the user input and the program module set by the application setting data are explained above. However, the present invention is not limited to this. For example, the data utilization program may be created by a text language such as the C language or may be configured by a library described in the C language and a library execution block that executes the library.

SUMMARY

Viewpoint 1

The PC 2 is an example of a setting device that sets a programmable logic controller. The PLC 1 is an example of the programmable logic controller. The CPU 31 functions as first executing means for executing a user program (for example, a control program). The control program is, for example, a ladder program and is a user program for executing control (for example, position control of a positioning device), which is a main purpose of the PLC. The storage device 32 and the device section 34 function as storing means, which is a device or a variable, which is a memory region accessed by the first executing means according to the control program. The collecting section 82 functions as collecting means for collecting, from the storing means, data designated as a collection target. The flow executing section 81 functions as second executing means for executing predetermined data processing according to a data utilization program (for example, a flow) on time-series data respectively collected at different timings from the storing means. The data utilization program is a user program for collecting data (for example, information stored in the device or the variable) designated by the user as a collection target. The data utilization program stores, in the variable, a device value acquired from the device and stores the variable in a data memory (for example, the memory 42a). Further, the data utilization program may read out the variable held in the data memory, execute analysis processing, and create display data. The display processing section 84 functions as generating means for generating display data of a dashboard that displays an execution result of the data utilization program. The Web server 85 functions as providing means for providing the display data to an external computer (for example, the PC 2b). The storage device 12 functions as storing means for storing templates of display data of a plurality of dashboards and templates of a plurality of data utilization programs. The CPU 11, the operation section 8, the dashboard selecting section 52, the selection screen 100, and the like function as first receiving means for receiving selection of one dashboard among the plurality of dashboards. The CPU 11, the operation section 8, the parameter designating section 53, the setting screen 110, and the like function as second receiving means for receiving designation of collection target data by the collecting means. The creating section 54 functions as creating means for creating setting data including a set of a template of a selected dashboard and a template of the data utilization program linked with the selected dashboard in order to display, on the selected dashboard, display target data, which is data calculated by executing predetermined data processing of the collection target data according to the data utilization program. The transfer section 60 functions as transferring means for transferring the setting data to the programmable logic controller. The flow executing section 81 may execute, based on the setting data, predetermined data processing on the collection target data to generate the display target data. The display target data (for example, wOperationRatio) is linked with a graph display component included in the template of the display data of the selected dashboard. Since the templates of the dashboards and the templates of the data utilization programs are prepared in this way, the user can complete the dashboard and the data utilization programs simply by setting parameters necessary for the templates. That is, according to the present invention, work for creating the data utilization program for collecting the control data held by the PLC and the dashboard that displays the data utilization program is facilitated.

Note that the device memory may be understood as storing means that can be treated by the "control program (the user program)" and can be set as a data collection target by the "data utilization program (the user program)". The data memory may be understood as storing means for storing data that can be treated by the "data utilization program (the user program)" and can be displayed as a value of a display component of the "dashboard".

Viewpoint 2

The display section 7 may function as display means for displaying a setting screen for receiving selection of one dashboard among the plurality of dashboards and designation of collection target data by the collecting means. As shown in FIG. 7, the first receiving means may receive designation of a dashboard through the setting screen. As shown in FIG. 8, the second receiving means may receive designation of collection target data through the setting screen. Consequently, even a user with less knowledge of programming could easily execute selection of a dashboard and designation of parameters.

Viewpoint 3

As explained concerning the preview button 118, the storage device 12 may store dummy data input to the template of the display data of the dashboard. The CPU 11 may display a preview of the dashboard on the display section 7 by inputting the dummy data to the template of the display data of the dashboard.

Viewpoint 4

The display data may be display data (for example, HTML data, CSS data, or a Java Script (registered trademark) code) displayable on a Web browser. The providing means may be the Web server 85. Consequently, even a general computer such as the PC 2b would be able to display the dashboard.

Viewpoint 5

The plurality of dashboards may be respectively associated with different data processing applications (for example, a loss analysis, waveform monitoring, and FFT). The flow/dashboard creating section 51 may receive selection of one data processing application among the plurality of data processing applications as selection of a dashboard corresponding to the one data processing application. When the data utilization application is configured from the dashboard and the data utilization program as explained above, the selection of the application and the selection of the dashboard are synonymous.

Viewpoint 6

The flow/dashboard creating section 51 may select, among the templates of the plurality of data utilization programs, a template of a data utilization program corresponding to the selection of the dashboard and the designation of the collection target data and complete the data utilization program based on the selected template of the data utilization program.

Viewpoint 7

As shown in FIG. 1, the programmable logic controller may include the basic unit 3 and the extension units 4 connected to the basic unit 3. The basic unit 3 may include first executing means and storing means. The data utilization unit among the extension units 4 may include collecting means, second executing means, generating means, and providing means. The extension unit 4a operating as the data utilization unit is connected to the basic unit 3 in this way. Consequently, the user can easily realize data utilization. A load concerning data processing of the basic unit 3 is reduced.

Viewpoints 8 to 10

The flow/dashboard creating section 51 may receive reediting of a display component configuring the dashboard and reflect a result of the reediting of the display component on an arithmetic operation block corresponding to the reediting among the plurality of arithmetic operation blocks configuring the data utilization program corresponding to the dashboard. For example, the flow/dashboard creating section 51 may be configured to receive the reediting of the display component configuring the dashboard and delete or disable, in the setting data, an arithmetic operation block made unnecessary according to the reediting among the plurality of arithmetic operation blocks configuring the data utilization program corresponding to the dashboard. Consequently, the user would be capable of easily customizing the dashboard.

The flow/dashboard creating section 51 may receive reediting of an arithmetic operation block configuring a data utilization program corresponding to the dashboard. The flow/dashboard creating section 51 may reflect a result of the reediting of the arithmetic operation block on a display component corresponding to the reedited arithmetic operation block among the display components configuring the dashboard. Consequently, the user is capable of easily customizing the data utilization program.

Figure 13:
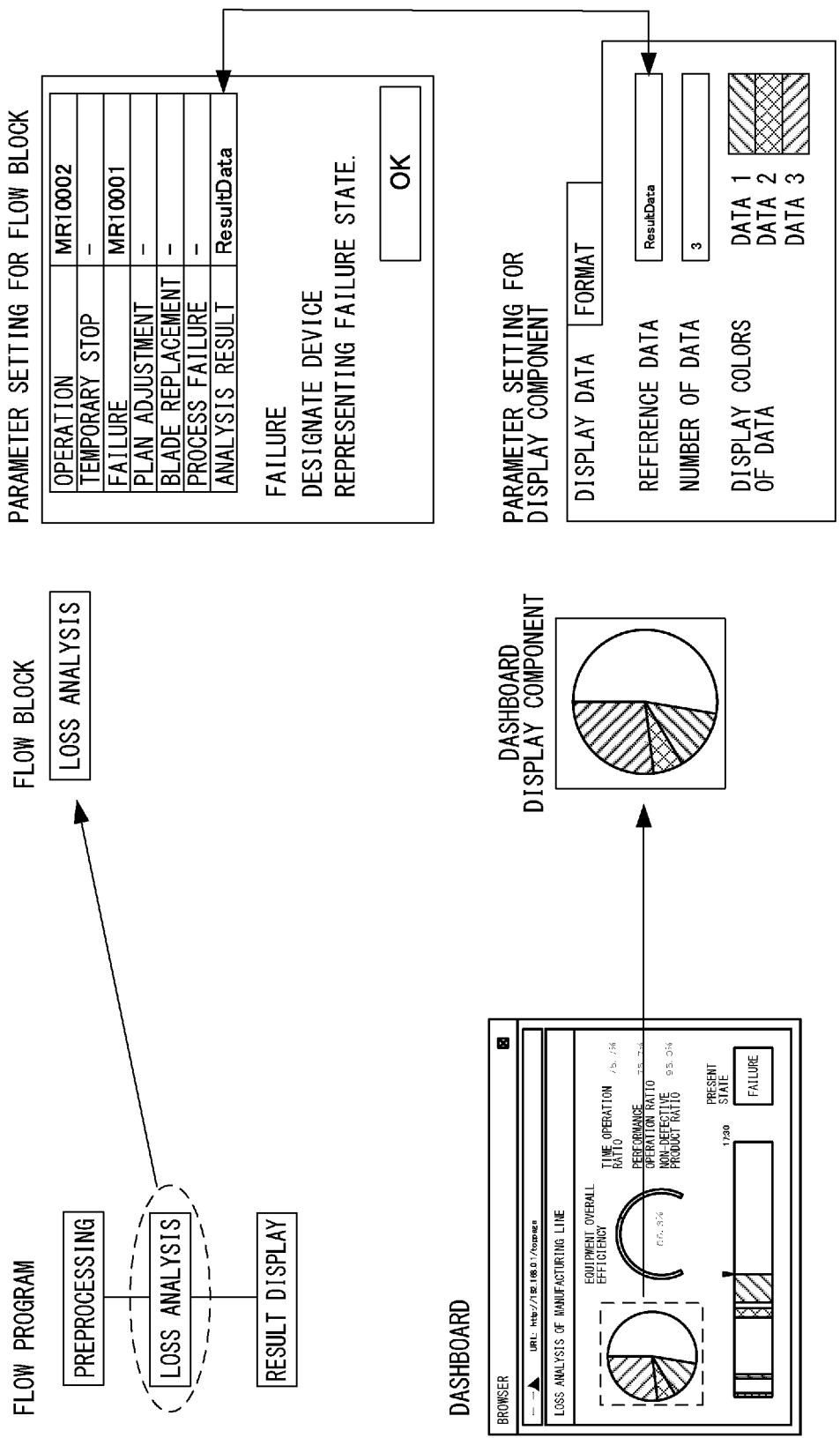
FIG. 13 is a diagram for explaining cooperated editing between the dashboard and a flow program.

FIG. 13 is a diagram for explaining the reediting. In this example, the flow program is configured from a plurality of flow blocks. When any one of the flow blocks is clicked, the flow/dashboard creating section 51 displays a parameter setting screen about the flow block. In this example, since the flow block that executes a loss analysis is designated, a parameter setting screen about the loss analysis is displayed. The user reedits the parameters through the parameter setting screen.

As shown in FIG. 13, this flow program is linked with a certain dashboard. When a display component configuring this dashboard is clicked, the flow/dashboard creating section 51 displays a parameter setting screen of the display component. The user reedits the parameters through the parameter setting screen.

Parameter setting for the flow block includes a saving destination variable of an analysis result. In this example, Result Data is set as the saving destination variable of the analysis result. On the other hand, parameter setting for the display component of the dashboard includes a reference-data designating section for designating data displayed on the display component. In this example, the reference-data designating section and the saving destination variable of the analysis result are linked with each other. Therefore, when the saving destination variable of the analysis result is changed from Result Data to Process Data in the flow block, the flow/dashboard creating section 51 also changes the reference-data designating section of the display component from Result Data to Process Data. Similarly, when the reference-data designating section of the display component is changed from Result Data to Process Data, the flow/dashboard creating section 51 also changes the saving destination variable of the analysis result from Result Data to Process Data in the flow block. Since one change is automatically reflected on the other change in this way, when the user changes one parameter, labor and time for finding out and changing the other parameter can be saved.

Viewpoint 11

As explained concerning the additional object 117, the flow/dashboard creating section 51 may be configured to receive addition of collection target data by the collecting means. The flow/dashboard creating section 51 may be configured to reflect the addition of the collection target data received by the second receiving means on the display component of the dashboard in the setting data and the arithmetic operation block of the data utilization program. The user edits the dashboard and the data utilization program simply by instructing the addition of the collection target data (analysis target data).

Viewpoint 12

The creating section 54 may further include importing means for importing, for a second programmable logic controller, setting data created for a first programmable logic controller. The importing means may copy the setting data created for the first programmable logic controller and edit a part of the copied setting data to create setting data for the second programmable logic controller. Consequently, it is possible to reuse the setting data among a plurality of PLCs. Therefore, a work load on the user would be reduced.

Viewpoint 13

The dashboard may be a dashboard that displays a result of a loss analysis, waveform monitoring, or a frequency analysis. Naturally, a data utilization application of another type may be adopted.

Viewpoint 14

The flow executing section 81 may pass an arithmetic operation result generated by a data utilization program for a first dashboard to a data utilization program for a second dashboard and execute analysis processing concerning the arithmetic operation result according to the data utilization program for the second dashboard. In this way, a plurality of data utilization applications may provide an analysis result in cooperation.

Viewpoint 15

The creating section 54 may include monitoring means for monitoring reediting of the control program, determining means for, when the control program is reedited, determining whether a device name of a reedited part of the control program and a device name included in setting data coincide, and replacing means for, when the device name of the reedited part of the control program and the device name included in the setting data coincide, replacing the device name included in the setting data with the device name of the reedited part of the control program. The creating section 54 may further include determining means for, when storing means used in the control program is changed from first storing means to second storing means according to the reediting of the control program, determining whether identification information (for example, the device name before the reediting) of the first storing means and identification information of the storing means included in the setting data coincide. The creating section 54 may further include replacing means for, when the identification information of the first storing means and the identification information of the storing means included in the setting data coincide, replacing the identification information of the storing means included in the setting data with identification information (for example, the device name after the reediting) of the second storing means. Consequently, labor and time for manually reflecting the reediting result of the control program on the setting data of the data utilization application would be reduced.

Viewpoint 16

The display connected to the PC 2 and the PLC 1 functions as a display device that displays, on the dashboard, an execution result of a data utilization program concerning data utilization executed in a programmable logic controller. The PLC 1 is an example of a PLC system.

The invention is not limited to the embodiment explained above. Various modifications are possible within the scope of the gist of the invention.

What is claimed is:

1. A setting device that sets a programmable logic controller,
   the programmable logic controller including:
   a first executing section configured to execute a control program;
   a storing section including a memory region or a variable to be accessed by the first executing section according to the control program;
   a collecting section configured to collect data designated as a collection target from the storing section;
   a second executing section configured to execute, according to a data utilization program, predetermined data processing on time-series data respectively collected at different timings from the storing section;
   a generating section configured to generate display data of a dashboard for displaying an execution result of the data utilization program; and
   a providing section configured to provide the display data to an external computer,
   the setting device comprising:
   a storing section configured to store templates of display data of a plurality of dashboards and templates of a plurality of data utilization programs;
   a first receiving section configured to receive selection of one dashboard from among the plurality of dashboards;
   a second receiving section configured to receive designation of the collection target data by the collecting section;
   a creating section configured to create setting data including a set of a template of the one dashboard selected and a template of a data utilization program linked with the one dashboard selected in order to display, with the one dashboard selected, display target data, which is data calculated by executing the predetermined data processing of the collection target data according to the data utilization program; and
   a transferring section configured to transfer the setting data to the programmable logic controller, wherein
   the second executing section executes, based on the setting data, the predetermined data processing on the collection target data to generate the display target data, and
   the display target data is linked with a graph display component included in a template of the display data of the one dashboard selected.

2. The setting device according to claim 1, further comprising a display section configured to display a setting screen for receiving selection of one dashboard among the plurality of dashboards and designation of a collection target data by the collecting section, wherein
   the first receiving section receives selection of the one dashboard through the setting screen and the second receiving section receives designation of the collection target data through the setting screen.

3. The setting device according to claim 2, wherein
the storing section stores dummy data input to the template of the display data of the dashboard, and
the display section inputs the dummy data to the template of the display data of the dashboard to display a preview of the dashboard.

4. The setting device according to claim 1, wherein
the display data is display data displayable on a Web browser, and
the providing section is a Web server.

5. The setting device according to claim 1, wherein
the plurality of dashboards are respectively associated with different data processing applications, and
the first receiving section receives selection of one data processing application among a plurality of data processing applications as selection of the dashboard corresponding to the one data processing application.

6. The setting device according to claim 1, wherein the creating section selects the template of the data utilization program corresponding to the selection of the one dashboard and the designation of the collection target data among the templates of the plurality of data utilization programs and completes the data utilization program based on the selected template of the data utilization program.

7. The setting device according to claim 1, wherein
the programmable logic controller includes:
a basic unit; and
extension units connected to the basic unit,
the basic unit includes the first executing section and the storing section, and
a data utilization unit among the extension units includes the collecting section, the second executing section, the generating section, and the providing section.

8. The setting device according to claim 1, wherein the creating section is configured to receive reediting of a display component configuring the dashboard and reflect a result of the reediting of the display component on an arithmetic operation block corresponding to the reediting among a plurality of arithmetic operation blocks configuring a data utilization program corresponding to the dashboard.

9. The setting device according to claim 1, wherein the creating section is configured to receive reediting of a display component configuring the dashboard and deletes or disable, in the setting data, an arithmetic operation block made unnecessary according to the reediting among a plurality of arithmetic operation blocks configuring a data utilization program corresponding to the dashboard.

10. The setting device according to claim 1, wherein the creating section is configured to receive reediting of an arithmetic operation block configuring a data utilization program corresponding to the dashboard and reflect a result of the reediting of the arithmetic operation block on a display component corresponding to the reedited arithmetic operation block among display components configuring the dashboard.

11. The setting device according to claim 1, wherein
the second receiving section is configured to receive addition of collection target data by the collecting section, and
the creating section is configured to reflect the addition of the collection target data received by the second receiving section on a display component of the one dashboard in the setting data and an arithmetic operation block of the data utilization program.

12. The setting device according to claim 1, wherein
the creating section further includes an importing section configured to import, for a second programmable logic controller, setting data created for a first programmable logic controller, and
the importing section copies the setting data created for the first programmable logic controller and edits a part of the copied setting data to create setting data for the second programmable logic controller.

13. The setting device according to claim 1, wherein the dashboard is a dashboard that displays a result of a loss analysis, waveform monitoring, or a frequency analysis.

14. The setting device according to claim 1, wherein the second executing section passes an arithmetic operation result generated by a data utilization program for a first dashboard to a data utilization program for a second dashboard and executes analysis processing concerning the arithmetic operation result according to the data utilization program for the second dashboard.

15. The setting device according to claim 1, wherein
the creating section includes:
a monitoring section configured to monitor reediting of the control program;
a determining section configured to, when a storing section used in the control program is changed from a first storing section to a second storing section according to the reediting of the control program, determine whether identification information of the first storing section and identification information of the storing section included in the setting data coincide; and
a replacing section configured to, when the identification information of the first storing section and the identification information of the storing section included in the setting data coincide, replace the identification information of the storing section included in the setting data with the identification information of the second storing section.

16. A PLC system comprising:
a programmable logic controller;
a setting device that sets the programmable logic controller; and
a display device that displays, on a dashboard, an execution result of a data utilization program concerning data utilization executed by the programmable logic controller, wherein
the programmable logic controller includes:
a first executing section configured to execute a control program;
a storing section, which is a memory region or a variable that the first executing section accesses according to the control program;
a collecting section configured to collect, from the storing section, data designated as a collection target;
a second executing section configured to execute, according to a data utilization program, predetermined data processing on time-series data respectively collected at different timings from the storing section;
a generating section configured to generate display data of a dashboard for displaying an execution result of the data utilization program; and
a providing section configured to provide the display data to the display device and,
the setting device includes:
a storing section configured to store templates of display data of a plurality of dashboards and templates of a plurality of data utilization programs;

a first receiving section configured to receive selection of one dashboard among the plurality of dashboards;

a second receiving section configured to receive designation of the collection target data by the collecting section;

a creating section configured to create setting data including a set of a template of the one dashboard selected and a template of a data utilization program linked with the one dashboard selected in order to display, with the one dashboard selected, display target data, which is data calculated by executing the predetermined data processing of the collection target data according to the data utilization program; and a transferring section configured to transfer the setting data to the programmable logic controller, the second executing section executes, based on the setting data, the predetermined data processing on the collection target data to generate the display target data, and the display target data is linked with a graph display component included in the template of the display data of the selected dashboard.

17. The PLC system according to claim 16, wherein the programmable logic controller includes:

a basic unit; and extension units connected to the basic unit, the basic unit includes the first executing section and the storing section, and a data utilization unit among the extension units includes the collecting section, the second executing section, the generating section, and the providing section.

18. The PLC system according to claim 16, wherein the setting device further includes a display section configured to display a setting screen for receiving selection of one dashboard among the plurality of dashboards and designation of a collection target data by the collecting section, wherein the first receiving section receives selection of the one dashboard through the setting screen and the second receiving section receives designation of the collection target data through the setting screen.

19. The PLC system according to claim 18, wherein the storing section stores dummy data input to the template of the display data of the dashboard, and the display section inputs the dummy data to the template of the display data of the dashboard to display a preview of the dashboard.

20. The PLC system according to claim 16, wherein the creating section selects the template of the data utilization program corresponding to the selection of the one dashboard and the designation of the collection target data among the templates of the plurality of data utilization programs and completes the data utilization program based on the selected template of the data utilization program.

* * * * *